(12) United States Patent
Peterson et al.

(10) Patent No.: US 7,016,873 B1
(45) Date of Patent: Mar. 21, 2006

(54) SYSTEM AND METHOD FOR TAX SENSITIVE PORTFOLIO OPTIMIZATION

(75) Inventors: James Peterson, Walnut Creek, CA (US); Christopher Kleinbauer, Oakland, CA (US); Paul-Charles A. Pietranico, San Francisco, CA (US); Bill D. McDonald, Lafayette, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 328 days.

(21) Appl. No.: 09/654,627

(22) Filed: Sep. 5, 2000

Related U.S. Application Data

(60) Provisional application No. 60/186,518, filed on Mar. 2, 2000.

(51) Int. Cl.
*G06F 17/60* (2006.01)

(52) U.S. Cl. .......................... 705/36 R; 705/35; 705/37
(58) Field of Classification Search ............ 705/35–37; 902/41
See application file for complete search history.

(56) References Cited

U.S. PATENT DOCUMENTS

| | | | |
|---|---|---|---|
| 4,933,842 A | 6/1990 | Durbin et al. | 364/408 |
| 5,101,353 A | 3/1992 | Lupien et al. | 364/408 |
| 5,126,936 A | 6/1992 | Champion et al. | 364/408 |
| 5,148,365 A * | 9/1992 | Dembo | 705/36 R |
| 5,193,056 A * | 3/1993 | Boes | 705/36 |
| 5,644,727 A | 7/1997 | Atkins | 395/240 |
| 5,784,696 A * | 7/1998 | Melnikoff | 705/36 |
| 5,806,049 A * | 9/1998 | Petruzzi | 705/36 R |
| 5,812,987 A * | 9/1998 | Luskin et al. | 705/36 |
| 5,819,238 A * | 10/1998 | Fernholz | 705/36 R |
| 5,852,811 A * | 12/1998 | Atkins | 705/36 |
| 5,884,283 A | 3/1999 | Manos | 705/30 |
| 5,884,287 A * | 3/1999 | Edesess | 705/36 |
| 5,918,217 A * | 6/1999 | Maggioncalda et al. | 705/36 |
| 6,003,018 A * | 12/1999 | Michaud et al. | 705/36 |
| 6,012,044 A * | 1/2000 | Maggioncalda et al. | 705/36 |
| 6,021,397 A * | 2/2000 | Jones et al. | 705/36 |
| 6,078,904 A * | 6/2000 | Rebane | 705/36 |
| 6,115,697 A * | 9/2000 | Gottstein | 705/35 |
| 6,240,399 B1 * | 5/2001 | Frank et al. | 705/36 |
| 6,292,787 B1 * | 9/2001 | Scott et al. | 705/36 |
| 6,381,586 B1 * | 4/2002 | Glasserman et al. | 705/36 |
| 6,393,409 B1 * | 5/2002 | Young et al. | 705/37 |
| 6,484,152 B1 * | 11/2002 | Robinson | 705/36 |
| 6,510,419 B1 * | 1/2003 | Gatto | 705/36 |
| 2002/0013754 A1 * | 1/2002 | Frank et al. | 705/36 |
| 2003/0078867 A1 * | 4/2003 | Scott et al. | 705/36 |

FOREIGN PATENT DOCUMENTS

| | | | |
|---|---|---|---|
| EP | 0401203 | * | 5/1990 |
| JP | 11110447 A | * | 10/1997 |

(Continued)

OTHER PUBLICATIONS

Schnieper, Rene; "Portfolio Optimization"; Oct. 7-10, 1998 General Insurance Convention and Astin Colloquium; pp. 480-527.*

(Continued)

*Primary Examiner*—Ella Colbert
(74) *Attorney, Agent, or Firm*—Farella Braun & Martel LLP

(57) ABSTRACT

A method and apparatus are provided which account for tax impact in predicting investment return. Data for taxable investments, data for non-taxable investments and investor data are received and an optimization is performed which includes all of these data. An investment recommendation is provided to the investor based on the optimization.

6 Claims, 13 Drawing Sheets

FOREIGN PATENT DOCUMENTS

| | | | |
|---|---|---|---|
| JP | 02001076057 A | * | 3/2001 |
| WO | WO 98/13776 | | 4/1998 |
| WO | WO 99/28845 | * | 6/1999 |

OTHER PUBLICATIONS

Butrimovitz, Gerald, Ph.D., CFP; "Asset Allocation, Portfolio Optimization: Better Risk-Adjusted Performance?"; Journal of Financial Planning; Aug. 1999; Article 13; pp. 1-12.*

Mangiero, Susan M., Ph.D., CFA; "Efficient Asset Management: A practical Guide to Stock Portfolio Optimization and Asset Allocation"; Financial Engineering News; Mar. 1999; pp. 1-2.*

Business Week, Science & Technology section, p. 108, A Financial Planner With Nerves of Silicon.

* cited by examiner

Determine what type of investor you are and match a plan to your goals.

The type of plan that best suits you depends on the type of investor you--your Personal Investor Profile. Are you an aggressive investor, a conservative investor or some where in between? We've designed this questionnaire to help you find out quickly and easily. By answering these questions, you can combine 1) the time period you want to consider for investing, your "time horizon," and 2) how you feel about the risks of investing, your "risk tolerance," to define your investor profile.

Once you decide which Personal Investor Profile best describes you, it's easy to choose the best way to allocate your assets and diversify your portfolio to meet your goals.

The questionnaire assumes that the money you plan to invest will be used for a long-term purpose such as retirement or a single purpose such as saving for a home. Read it over and check the answers that apply to you. Then follow the instructions to select an asset allocation plan.

① I plan to begin withdrawing money from my investments for major needs within:

| | |
|---|---|
| Less than 3 years | 1 points |
| 3-5 years | 3 points |
| 6-10 years | 7 points |
| 11 years or more | 10 points |

_____ points

② Once I begin withdrawing funds from my investments, I plan to spend all of the funds within:

| | |
|---|---|
| Less than 2 years | 0 points |
| 2-5 years | 1 points |
| 6-10 years | 4 points |
| 11 years or more | 8 points |

_____ points

SUBTOTAL A

*Add your points from questions 1 and 2 and enter here* _____

If your score is *less than* 3, STOP HERE.

A score of less than 3 indicates a very short investment time horizon. For such a short time horizon, a relatively low-risk portfolio of 40% short-term (average maturity of five years or less) bonds or bond funds and 60% cash is recommended, as stock investments may be significantly more volatile in the short term. Go directly to the short-term asset allocation chart.

If your score is *greater than* 3, please continue.

FIG. 1A

③ I would describe my knowledge of investments as:

| | |
|---|---|
| None | 0 points |
| Limited | 2 points |
| Good | 4 points |
| Extensive | 6 points |

_____ points

④ When I decide how to invest my money, I am:

| | |
|---|---|
| Most concerned about the possibility of my investment losing value | 0 points |
| Equally concerned about the possibility of my investment losing or gaining value | 4 points |
| Most concerned about the possibility of my investment gaining value | 8 points |

_____ points

⑤ Review the following list and select the investments you currently own or have owned in the past. Then choose the one with the highest number of points and enter that number.

*(Example: You now own stock funds and have in the past purchased international securities. Your score would be 8.)*

| | |
|---|---|
| Money market funds or cash equivalents | 0 points |
| Bonds and/or bond funds | 3 points |
| Stocks and/or stock funds | 6 points |
| International securities and/or international funds | 8 points |

(Maximum possible score = 8)

_____ points

⑥ Consider this scenario:

Imagine that over the past three months, the overall stock market lost 25% of its value. An individual stock investment you own also lost 25% of its value. What would you do?

I would:

| | |
|---|---|
| Sell all of my shares | 0 points |
| Sell some of my shares | 2 points |
| Do nothing | 5 points |
| Buy more shares | 8 points |

_____ points

⑦ Review the following chart:

We've outlined the most likely best and worst case annual returns of five hypothetical investment plans. Which range of possible outcomes is most acceptable to you or best suits your investment philosophy?

*(The figures are hypothetical and do not represent the performance of any particular investment.)*

FIG. 1B

| Investment Plans | Avg. Annualized Return (1 year) | Best Case Scenario (1 year) | Worst Case Scenario (1 year) | Points |
|---|---|---|---|---|
| Investment Plan A | 7.2% | 16.3% | -5.6% | 0 points |
| Investment Plan B | 9.0% | 25.0% | -12.1% | 3 points |
| Investment Plan C | 10.4% | 33.6% | -18.2% | 6 points |
| Investment Plan D | 11.7% | 42.8% | -24.0% | 8 points |
| Investment PlansE | 12.5% | 50.0% | -28.2% | 10 points |

_____ points

▶ SUBTOTAL B

*Add your points for questions 3 through 7 and enter here* _____

Now you're ready to determine your Personal Investor Profile and choose a corresponding asset allocation plan.

① Enter SUBTOTAL A here _____

This number represents your TIME HORIZON score.

Enter SUBTOTAL B here _____

This number represents your RISK TOLERANCE score.

② Plot your TIME HORIZON score and your RISK TOLERANCE score on the Personal Investor Profile chart and locate their intersection point. Then find the corresponding asset allocation plan on the following page.

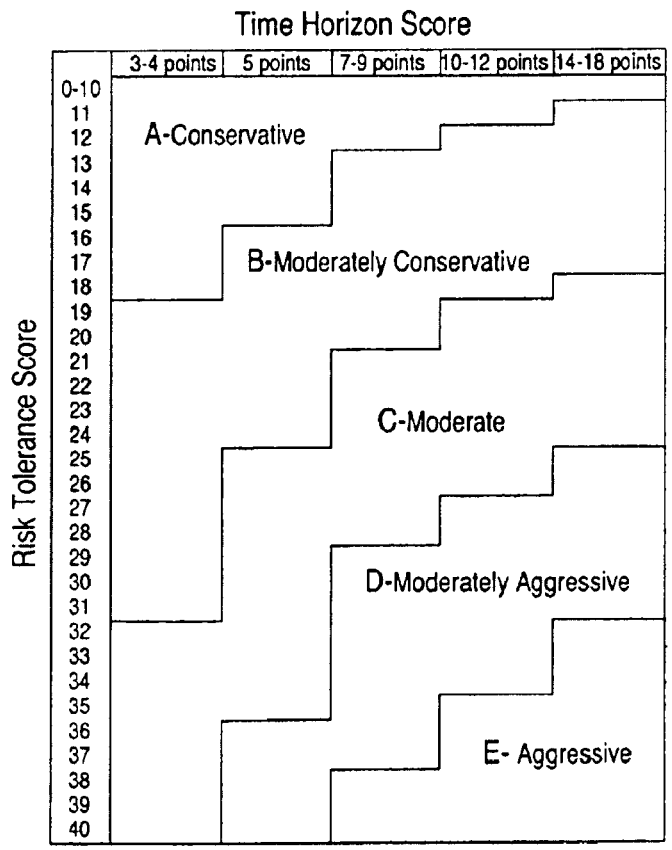

FIG. 1C

Now find your corresponding asset allocation plan.

The following allocation plans match the Personal Investor Profiles on the previous page-- A through E. Now that you know your own profile, go to the corresponding chart below to determine how to allocate your assets. Then go to Step 2 to choose a solution that suits your plan.

Short term

For investors who want current income and a high degree of stability in their investments. Given a short-term time horizon, it is prudent to invest in asset classes that experience relatively minor price fluctuations, such as short-term fixed-income funds and money market funds.

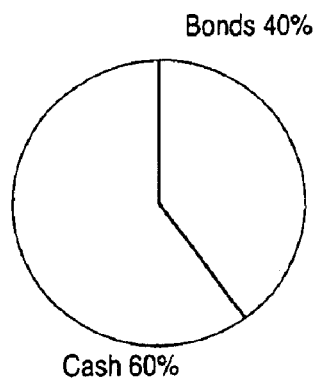

FIG. 2

(A) Conservative

Average annual return (1970-1996): 9.44%
Best year: 21.81%
Worst year: -1.25%

For investors who want current income and stability and aren't concerned about increasing the value of their investments.

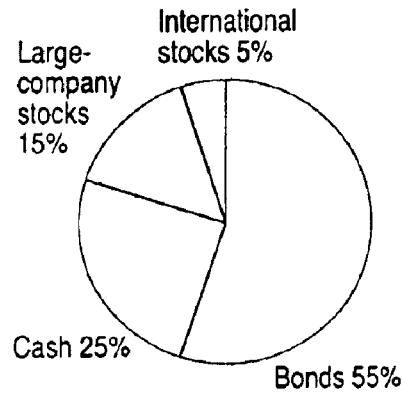

FIG. 2A

(B) Moderately Conservative

Average annual return (1970-1996): 10.65%
Best year: 25.57%
Worst year: -6.54%

For investors who want current income and stability, with some increase in the value of their investments.

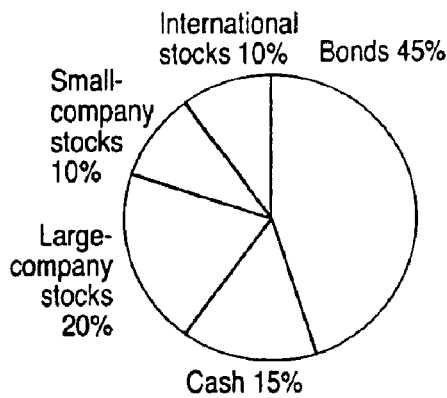

Ⓒ Moderate

Average annual return
(1970-1996): 11.55%
Best year: 29.76%
Worst year: -12.95%

For long-term investors who don't need current income and want reasonable but stable growth. Some fluctuations are tolerable, but they want less risk than the overall stock market.

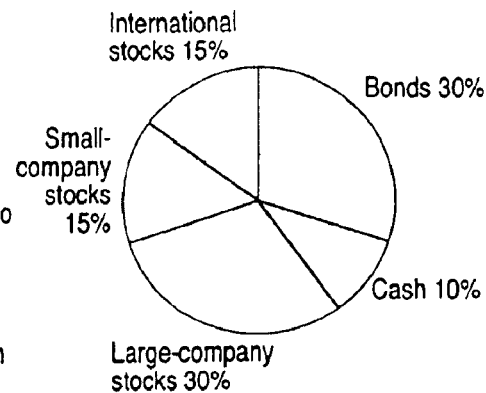

FIG. 2D

Ⓓ Moderately Aggressive

Average annual return
(1970-1996): 12.41%
Best year: 36.63%
Worst year: -19.14%

For long-term investors who want good growth and don't need current income. A fair amount of risk is acceptable, but not as much as if they invested exclusively in stocks.

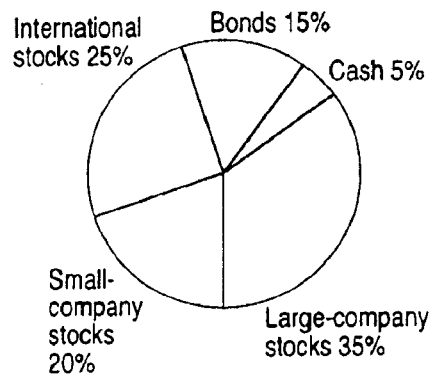

FIG. 2E

Ⓔ Aggressive

Average annual return
(1970-1996): 12.89%
Best year: 42.39%
Worst year: -23.82%

For long-term investors who want high growth and don't need current income. Substantial year-to-year volatility in value is acceptable in exchange for a potentially high long-term return.

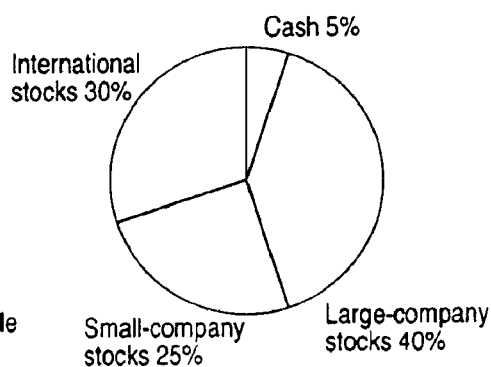

1.13 High-Level Application Environment
Portfolio Optimizer
High-Level Application Environment

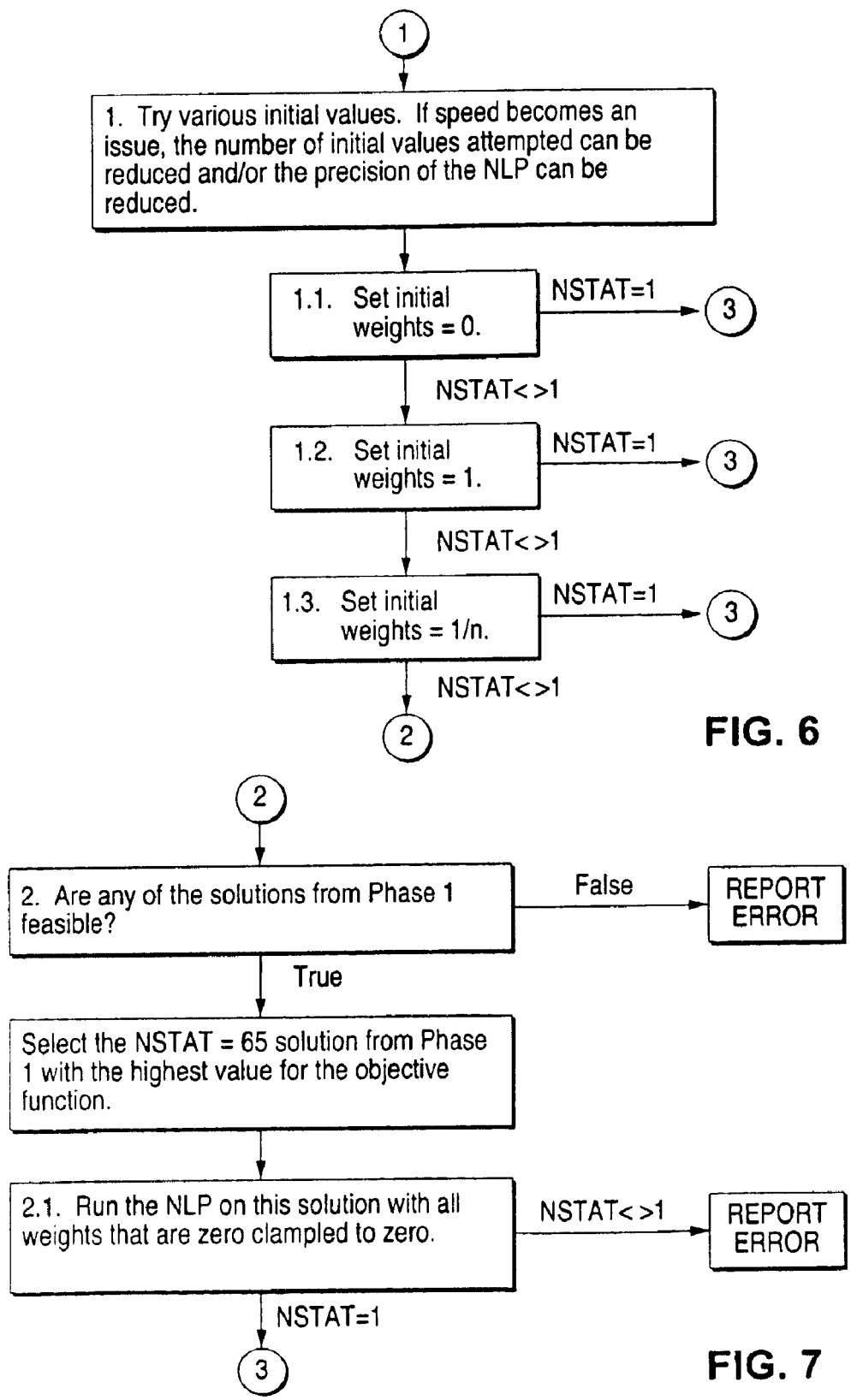

(4)

At this point an optimal solution has been identified from the NLP. This cleanup phase will make the transformations necessary to link the results with the final user interface.

REPORT ERROR

There are three identifiable cases to be addressed where a solution can not be reported to the user:

1) The NLP can not solve due to the lack of funds--it is possible, a priori, to determine when there is not a feasible solution due to the fund minimums and how the discretionary funds are allocated across the tax/nontax accounts. A reporting mechanism should be designed to account for this case. an alternate to consider is that for these cases we recommend an asset allocation fund apropriate for the user's risk tolerance, such as the Schwab MarketTrack funds.

2) The NLP does not indicate a solution in any phase before the minimum investment criteria are considered--we do not anticipate that this will occur, given the robustness of the iterative solution method, but it cannot be ruled out. Thus an error reporting mechanism must provide for the case where the NLP just does not work.

3) There are situations in phase 3 where it is possible for the NLP to fail. although the flexibility of the 3.4 technique should preclude most all of these, an error is still possible. We need an error reporting mechanism for this possibility. in these cases, however, we may be able to modify the solution approach to resolve the error.

The error reorting system will include a log file where the step at which the solution failed is identified. This will help us identify errors where a change to the algorithm can be made to avoid similar errors in the future.

FIG. 9

SYSTEM AND METHOD FOR TAX SENSITIVE PORTFOLIO OPTIMIZATION

PRIORITY

This application claims the benefit of provisional application Ser. No. 60/186,518, filed Mar. 2, 2000.

COPYRIGHT NOTICE

Material is contained in this application which is subject to copyright protection. The copyright owner has no objection to the facsimile reproduction of the patent disclosure by any person as it appears in the Patent and Trademark Office patent files or records, but otherwise reserves all rights to the copyrighted material.

BACKGROUND OF THE INVENTION

Recently, there has been a proliferation of software packages released that claim to help individuals make better investment decisions. Prior art investment software packages often utilize portfolio optimization methods to make specific security investment recommendations. Generally speaking, portfolio optimization refers to the process of maximizing the expected return on a portfolio for a pre-specified level of portfolio risk. Software packages that utilize portfolio optimization typically do not consider the tax consequences associated with investment decisions. As such, this class of portfolio optimization based software is only useful for making investment decisions within non-taxable accounts, such as 401(k) accounts.

The importance of considering taxes in the portfolio optimization problem is well established in the prior art. Techniques for performing portfolio optimization when investors are subject to taxes are discussed in the prior art, but these techniques typically apply to investors making investment decisions within their taxable account only. Some techniques ignore existing investments for which capital gains taxes might be due if a sale is recommended. However, making investment decisions within the context of the investor's entire portfolio, which can include both taxable and non-taxable investment accounts, is a generally accepted tenet of modern portfolio theory.

What is needed is an investment system that makes investment recommendations within both taxable and non-taxable accounts and considers the consequences of those decisions within the context of the investor's entire portfolio. More precisely, an investor typically has a set of financial securities, an "investment universe," that she can choose from when making investment decisions in her taxable account. This investment universe may or may not be the same as the universe of financial securities that she can choose from when making investment decisions in her non-taxable account. It is desirable to have an investment system that maximizes the investor's expected portfolio return after taxes for a level of portfolio risk that is determined by the investor's risk tolerance and provides investment recommendations within both taxable and non-taxable accounts. The output from this system could include specific dollar amounts, or investment percentages, to be invested in those financial securities included in the taxable investment universe and specific dollar amounts, or investment percentages, to be invested in those securities included in the non-taxable investment universe.

SUMMARY OF THE INVENTION

It is therefore an object of the present invention to provide an investment system that makes investment recommendations within both taxable and non-taxable accounts.

It is another object of the present invention to consider the consequences of investment recommendations within both taxable and non-taxable accounts in the context of an investor's entire portfolio.

It is another object of the present invention to have an investment system that maximizes the investor's after-tax expected portfolio return for a level of portfolio risk that is determined by the investor's risk tolerance and provides investment recommendations within both taxable and non-taxable accounts.

In accordance with one aspect of the present invention, a method is provided for characterizing an investment portfolio which includes the steps of: receiving data for one or more taxable investments; receiving data for one or more non-taxable investments; receiving investor profile information; performing an optimization which includes the data for the taxable investments, the data for the non-taxable investments and the investor profile information; and providing an investment recommendation. The investment recommendation may be, for example, with respect to asset classes or individual securities. The "investor profile information" could include, for example, an investor risk preference, a time horizon or tax bracket information. The optimization could be performed, for example, using a non-linear optimization routine.

In accordance with another aspect of the present invention, a method is provided for characterizing an investment portfolio, comprising the steps of identifying a universe of taxable investments and non-taxable investments; receiving customer profile information; performing an optimization which includes the data for the taxable investments, the data for the non-taxable investments and the customer profile information; and displaying an investment recommendation.

In accordance with yet another aspect of the present invention, a method is provided for characterizing an investment portfolio in a system in which a user communicates with a server by way of a computing device, comprising the steps of: identifying a universe of taxable investments and non-taxable investments; receiving customer profile information; performing an optimization on the data for the taxable investments, the data for the non-taxable investments and the customer profile information in the server; and displaying an investment recommendation on the computing device.

In accordance with still another aspect of the present invention, a method is provided for characterizing an investment portfolio in a system which includes a computing device, comprising the steps of: identifying a universe of taxable investments and non-taxable investments; receiving customer profile information; performing an optimization on the data for the taxable investments, the data for the non-taxable investments and the customer profile information in the computing device; and displaying an investment recommendation on the computing device.

These and other objects, features and advantages will become apparent when considered with reference to the following description and the accompanying drawings.

BRIEF DESCRIPTION OF THE DRAWINGS

FIGS. 1A through 1C are a series of exemplary questions for constructing an investor profile.

FIGS. 2 through 2E are a series of asset allocation pie charts which correspond to the results of the investor profiles of FIGS. 1A through 1C.

FIG. 6 is a flow chart which indicates a first phase of the optimization process according to one embodiment of the present invention.

FIG. 7 is a flow chart which indicates a second phase of the optimization process according to one embodiment of the present invention.

FIG. 9 is a flow chart which indicates a fourth phase of the optimization process according to one embodiment of the present invention.

DETAILED DESCRIPTION OF THE PREFERRED EMBODIMENTS

Figure 10:
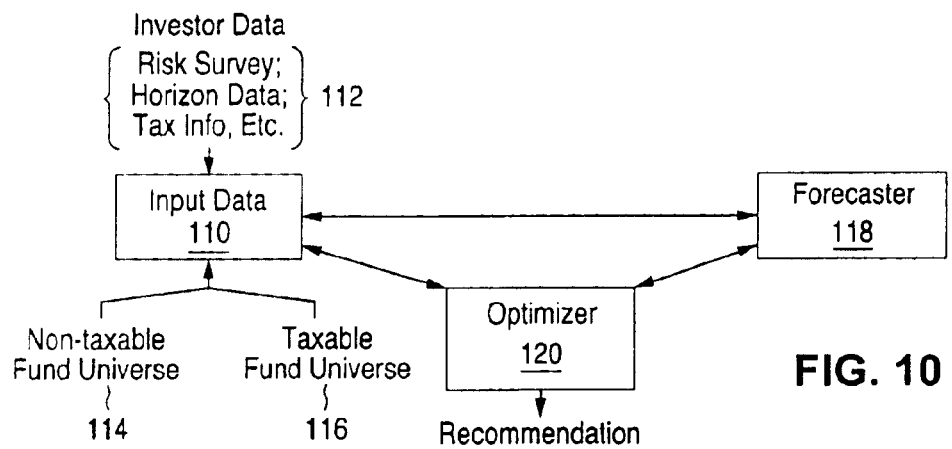
FIG. 10 is a flow chart which depicts an overview of the data input, forecaster and optimizer features of the present invention.

Referring now to FIG. 10, an embodiment of the present invention will now be described in greater detail. In accordance with the present invention, several functional areas are employed. Data are gathered in block 110, including investor data 112, data regarding non-taxable fund universe 114 and data regarding taxable fund universe 116. The investor data might include risk data, the customer's horizon data (e.g., years to retirement, etc.) and tax information (e.g., tax bracket, etc.).

The Forecaster block 118 optionally performs an analysis of the expected performance of specified investments over a specified horizon and under specified conditions.

The Optimizer block 120 uses the data from the input data block, specifies conditions to the Forecaster block 118 to obtain performance information about investment vehicles of interest, and then evaluates and optimizes an investment portfolio for the customer. The end result of the method and system of the present invention is a recommendation of an investment portfolio that best satisfies the goals of the customer, taking into account the tax effects on the portfolio in view of the customer's tax status.

The above functional blocks will be described in greater detail in the following sections in the context of investment vehicles of Charles Schwab and Co., Inc., ("Schwab") the assignee of the subject application. It is to be understood that the present invention is equally applicable to other investment vehicles and to those of other companies and entities, the following description being merely illustrative and not exhaustive of the features and details of the present invention. For example, where Schwab's mark Optimizer is referenced, one skilled in the art will readily understand that the following description is applicable to any such portfolio optimizer, however denominated.

Inputs to the Optimizer

An overview of the types of data that are input to the Optimizer is set forth in the following paragraphs.

User-Defined Inputs

Although the present invention need not involve Schwab accounts, it has been implemented at Schwab and therefore contemplates that a customer or client (who may or may not be the user) may have Schwab accounts and non-Schwab accounts. Information from all accounts should be input (e.g., number of shares and number of bonds). For each account the tax status is indicated (i.e., the user indicates whether the securities of the account in question are held in taxable or non-taxable accounts). 401(k) and 403(b) accounts should be identified. According to this embodiment, the average cost basis for taxable positions should be indicated. It should be understood that average cost basis is just one way to capture cost basis information. Other accounting conventions such as first-in-first-out or specific identification could be easily accommodated.

The client's initial cash position and the amount of cash to be added to each account during a specified time period, e.g., each year—taxable, non-taxable, and 401(k)—should be indicated. In addition, the client's federal and state tax rates should be indicated.

Retirement profile information from the client should also be input, including date of birth, retirement age and retirement annual income goal from these accounts (i.e., excluding social security and other income sources).

In this embodiment, a customer's risk tolerance, or risk level, must be input in some fashion. A customer's risk tolerance could be determined by filling out an investor risk profile such as the one set forth on FIGS. 1A through 1C. As noted on FIG. 1C, a customer's risk tolerance data may be combined with time horizon data to determine a corresponding asset allocation plan, such as the asset allocation plans set forth on FIGS. 2 through 2E. Alternatively, the customer could indicate her risk level by selecting one of a series of hypothetical investment plans, such as the asset allocation plans of FIGS. 2 through 2E.

Non-User Defined Inputs

In addition to the current price of each security in the portfolio, there are seven input data files from which the Optimizer extracts data. The following paragraphs will discuss these data and their construction. Note that constructing these data involves a great deal of pre-processing. As we discuss below, this pre-processing involves executing programs on a periodic basis, e.g., quarterly or annually. The Optimizer simply extracts data from the data files that are the result of the pre-processing, so none of the pre-processing needs to occur within the product itself.

Figure 3A:
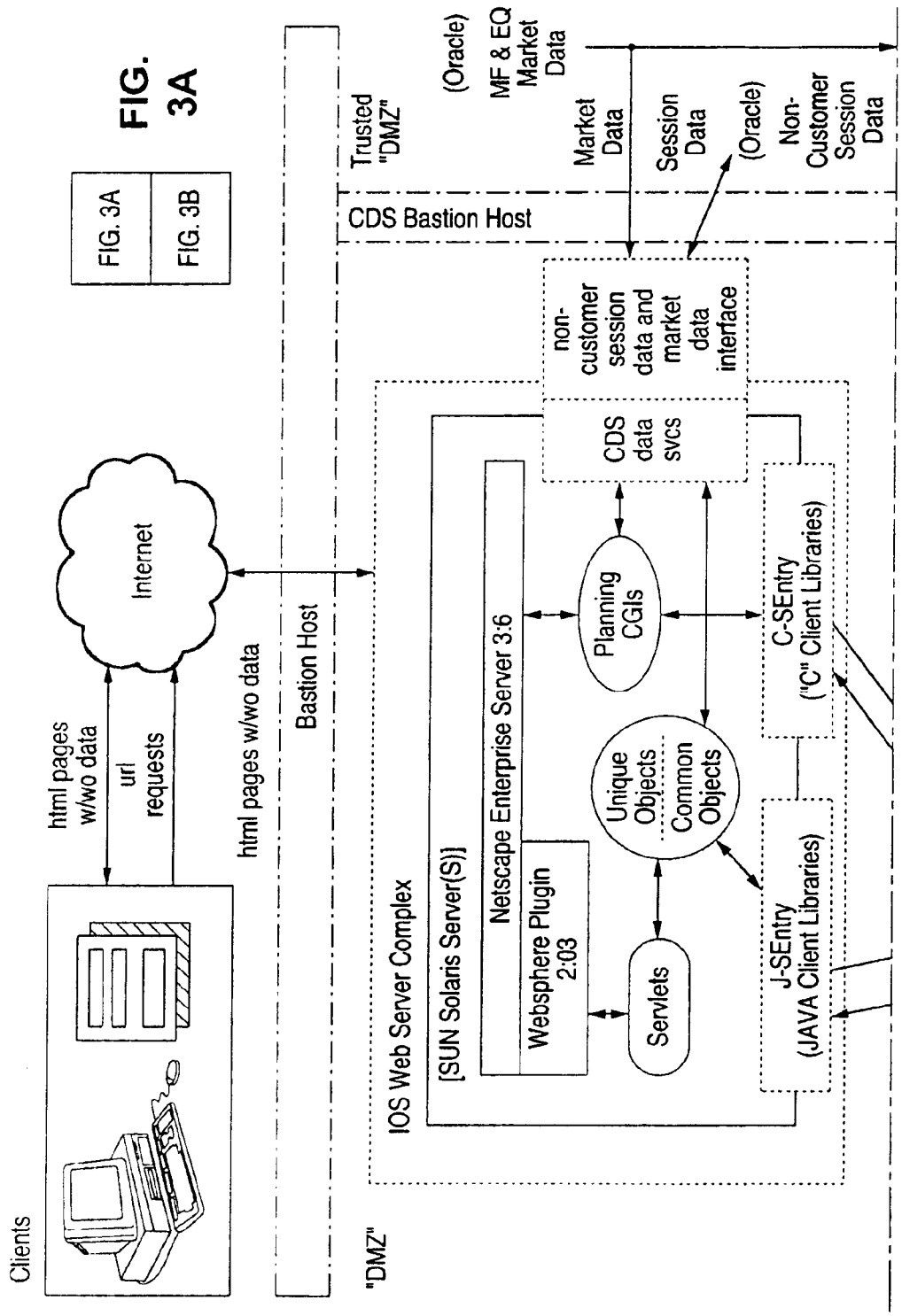
FIG. 3 is an overview of an apparatus for providing one embodiment of the present invention.
Figure 3B:
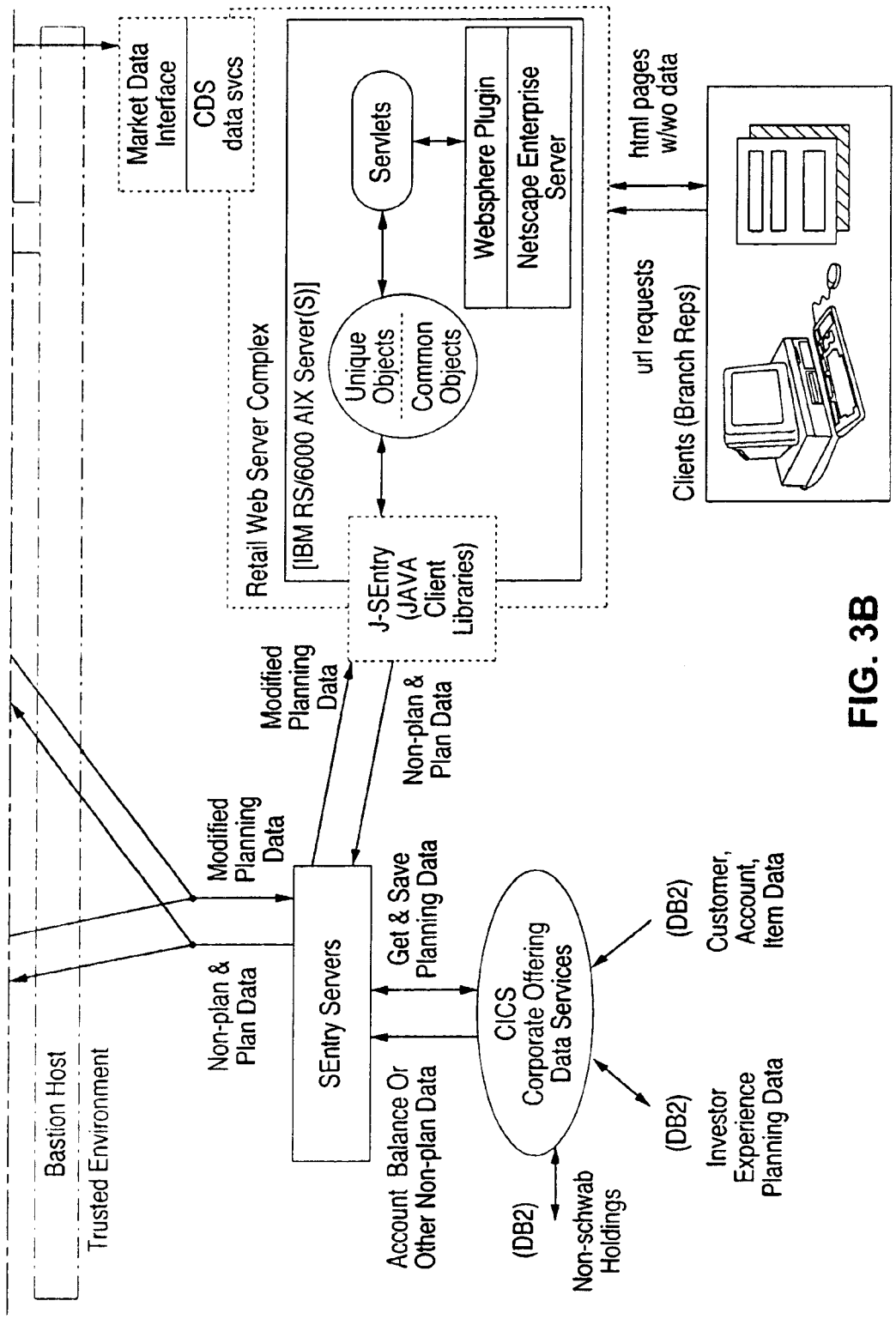

FIG. 3 illustrates one configuration of a system for providing data for the Optimizer. In this embodiment, customer account data, investor experience data and data regarding non-Schwab holdings are managed by Corporate Offering Data Services. The SEntry servers receive data from, and provide data to, both the IOS Web Server Complex and the Retail Web Server Complex. The Common Data Segment ("CDS") is a database (here, an Oracle database) in the web server environment which provides equity and mutual fund data to the IOS Web Server Complex and the Retail Web Server Complex. Branch representatives may submit requests to the Retail Web Server Complex, for example URL requests, and will receive data from the Retail Web Server Complex, for example via HTML. Alternatively, clients may submit requests to, and receive data from, the IOS Web Server Complex over the Internet.

Mutual Fund Data File

Return forecasts for individual securities are constructed from models of the way in which security returns move over time. These models depend on security type, i.e., mutual fund, stock, Treasury bond, cash.

A future return forecast can be broken into three components. First, there is a measure of the expected abnormal performance—or expected alpha—on the asset. Second, there is a systematic component to return. This component depends on the returns to several common factors that drive the returns on stocks and bonds (e.g., the market risk premium, the market capitalization premium, the term structure premium, etc.) and the sensitivity of the security's return to movements in those common factors. Third, there is an unsystematic—or "surprise"—component to return. The unsystematic component is that part of return that is completely unrelated to movements in the overall market (e.g., an unexpected labor strike at GM would likely have a negative effect on return that is unrelated to current market movements). Return surprises are unexpected, so estimates of this component of return are not needed for constructing expected return as is required to perform a portfolio optimization.

In this section the details associated with estimating expected alpha, factor sensitivities and unsystematic returns for the universe of mutual funds that an investor might own are discussed.

Estimating Expected alpha

According to this embodiment, the annual expected alpha for mutual fund i is given by:

$$\text{annual } E(\alpha_i) = \bar{\gamma}_1 \times a_i + \bar{\gamma}_2 \times \text{expense}_i, \quad (1)$$

where $a_i$ is the historical estimate of alpha for fund i, estimated over a prior period, e.g., the prior 36-month period, and $\text{expense}_i$ is the reported expense ratio. (The technique for estimating historical alpha is shown below.) The parameters $\bar{\gamma}_1$ and $\bar{\gamma}_2$ are the estimated return premiums for a one-unit exposure to $a_i$ and $\text{expense}_i$, respectively. In this embodiment, the parameters $\bar{\gamma}_1$ and $\bar{\gamma}_2$ are estimated separately for domestic stock funds, international stock funds, and bond funds. (This estimation technique is also discussed below.) Expected alphas for international bond funds are computed using the domestic bond fund parameters. Parameters are not estimated separately for international bond funds because large samples of these funds are not available.

According to this embodiment, the annual expected alpha for hybrid funds—funds that may own domestic stocks, international stocks, bonds or other securities—is determined using the following formula:

$$\text{annual } E(\alpha_i) = (\bar{\gamma}_1^{stocks} \times a_i + \bar{\gamma}_2^{stocks} \times \text{expense}_i)(\% \text{ US stocks}_i) + (\bar{\gamma}_1^{int} \times a_i + \bar{\gamma}_2^{int} \times \text{expense}_i)(\% \text{ non US stocks}_i) + (\bar{\gamma}_1^{bond} \times a_i + \bar{\gamma}_2^{bond} \times \text{expense}_i)(1-\% \text{ US stocks}_i - \% \text{ non US stocks}_i) \quad (2)$$

In equation (2), % US $\text{stocks}_i$ is the percentage of the fund's assets in U.S. common stocks and % nonUS $\text{stocks}_i$ is the percentage in foreign stocks. An implicit assumption in equation (2) is that the securities that are not classified as ordinary stocks by the data vendor, e.g., preferred stock and convertible securities, behave more like bonds than stocks.

In this embodiment, equation (1) or (2) gives a fund's annual expected alpha for the first 2 forecast years. Following this initial 2-year period, $$\text{annual } E(\alpha_i) = -\text{expense}_i. \quad (3)$$

The reasons for doing this are twofold. First, it's very unlikely that a fund could maintain a positive alpha too long into the future due to competitive pressures. (In other words, a high positive alpha for an extended period is not consistent with a long-run equilibrium in the mutual fund industry.) In the absence of such an assumption, forecasts of future wealth will be extremely high for funds with high historical alphas. In addition, the Optimizer would heavily favor those funds with the highest alphas. Second, past research has shown that mutual fund returns are predictable for about a 1-year horizon. This favors giving high performing funds some credit for past performance, but not extrapolating this success too far into the future given the weak statistical relationship between past fund returns and fund returns more than 1 year in the future.

The expected alpha computed from any of equations (1)–(3) is in terms of annual percentage return. The following formula is used to convert expected alpha to a monthly amount in decimal form:

$$\text{monthly } E(\alpha_i) = \left[1 + \frac{\text{annual } E(\alpha_i)}{100}\right]^{1/12} - 1. \quad (4)$$

To distinguish among expected alpha estimates for the first 2 years (24 months), define $E_{1-24}(\alpha_i)$ as the monthly expected alpha for the first 24 months and $E_{25-H}(\alpha_i)$ as the monthly expected alpha for months 25 through the horizon month H. (In other words, H is the number of months in the user's retirement horizon.)

Estimation of $\bar{\gamma}_1$ and $\bar{\gamma}_2$ require a model of the way in which the returns on stocks and bonds behave over time. The modeling choice in the preferred embodiment is based on extensive academic research regarding the time series behavior of common stock and bond returns, especially Fama and French (1993). This research has shown that the following five-factor model does a good job explaining the returns on common stocks and bonds:

$$r_{i,t} - r_{f,t} = a_i + \beta_i(r_{m,t} - r_{f,t}) + s_i SML_t + v_i VMG_t + t_i TERM_t + d_i DEF_t + e_t. \quad (5)$$

(Since mutual funds hold stocks and bonds, this model is also useful for mutual funds.) Here $r_{i,t}$ is the fund return in period t, $r_{f,t}$ is the risk-free return, $a_i$ is a historical measure of abnormal performance, $r_{m,t} - r_{f,t}$ is the market factor, $SML_t$ is a small-minus-large-cap factor, $VMG_t$ is a value-minus-growth factor, $TERM_t$ is a factor that captures the return differential between long- and short-term bonds, and $DEF_t$ is a factor capturing the return differential between high- and low-grade bonds. Table 1 contains an exemplary set of factor data definitions.

TABLE 1

Exemplary Factor Data Definitions

| Variable | Series |
| --- | --- |
| $r_f$ | US 30-day T-bill total return |
| Domestic stock | |
| $r_m$ | Large Cap Stock |
| SML | Large Cap Stock - Small Cap Stock |
| VMG | [(Large Cap Value − Large Cap Growth) + (Small Cap Value − Small Cap Growth)]/2 |
| International stock | |
| $r_m^w$ | World ex-US |
| SML | International Small Cap - World ex-US |
| VMG | International Value - International Growth |
| Bonds | |
| TERM | US Bond Horizon Premium |
| DEF | US Bond Default Premium |

At this point it is worth noting that different specifications can use different factors and/or different series to construct the factors. The important point is that the factors do a good job explaining the returns on the assets being modeled. In other embodiments, different factors may be required to model the returns on securities that are not modeled here.

We use a two-step process to estimate $\bar{\gamma}_1$ and $\bar{\gamma}_2$. For domestic and international stock funds, we estimate the following cross-sectional ordinary least squares (OLS) regression for each quarter t in the sample period:

$$r_{i,t}=\gamma_{0,t}+\gamma_{1,t}\hat{a}_i+\gamma_{2,t}expense_i+\gamma_{3,t}\hat{\beta}_i+\gamma_{4,t}\hat{s}_i+\gamma_{5,t}\hat{v}_i+\epsilon_{i,t}, i=1,\ldots,N \qquad (6)$$

where $r_{i,t}$ is the annualized return for the quarter, N is the number of funds in the sample for a particular quarter, the $\gamma_{k,t}$'s k=1, ..., 5 are the OLS regression slope coefficients (these are the coefficients being estimated) and $\epsilon_{i,t}$ is the regression error term. In this embodiment the regression (6) is estimated quarterly, but it could be estimated at other frequencies, e.g., monthly or annually.

Prior to estimating (6), the coefficients $\hat{a}_i$, $\hat{\beta}_i$, $\hat{s}_i$ and $\hat{v}_i$ are estimated for each asset i using data over a prior period via the OLS regression (5), e.g., the prior 36–60 (at least 36 and no more than 60) month period. (The ˆsymbol over a variable means that the variable has already been statistically estimated.) In this embodiment, the two bond factors are included in the equity fund time-series regressions because many stock funds own some bonds and because these factors do a good job explaining the return variation on these securities. By doing so, the coefficients on the stock market factors may be estimated with more precision. The average TERM and DEF premiums, however, are very small, so including the coefficients $t_i$ and $d_i$ in the cross-sectional regression (6) adds virtually no explanatory power to that regression. Including $t_i$ and $d_i$ in regression (6) would introduce estimation error—or statistical noise—into the estimation process, so these variables are not included.

The cross-sectional regression (6) is estimated for every quarter in the sample period. The annualized time-series average, $\bar{\gamma}_k$, of the quarterly cross-sectional regression coefficients (the average of the $\hat{\gamma}_{k,t}$'s) are then computed.

In this embodiment, the same models are used to determine the expected alpha for international funds. International index data can be used in lieu of domestic index data when estimating regression (5). Unfortunately, international bond market data are not readily available. In one embodiment, domestic bond market factors are used instead of international factors when estimating sensitivities for international bond funds.

Although the same approach can be used to estimate bond fund expected alphas, the models are different because different factors are better suited for pricing bonds than stocks. For each quarter in the sample, the following cross-sectional OLS regression model for bond funds is estimated:

$$r_{i,t}=\gamma_{0,t}+\gamma_{1,t}\hat{a}_i+\gamma_{2,t}expense_i+\gamma_{3,t}\hat{\beta}_i+\gamma_{4,t}\hat{t}_i+\gamma_{5,t}\hat{d}_i+\epsilon_{i,t}, i=1,\ldots,N. \qquad (7)$$

According to this embodiment, the coefficients $\hat{a}_i$, $\hat{\beta}_i$, $\hat{t}_i$ and $\hat{d}_i$ for each bond fund are estimated using data over the prior period via the following OLS regression:

$$r_{i,t}-r_{f,t}=a_i+\beta_i(r_{m,t}-r_{f,t})+t_iTERM_t+d_iDEF_t+e_t. \qquad (8)$$

The market risk premium is included in (8) because risky bonds tend to have some correlation with the overall stock market. The other stock market factors are not included in (8) because the estimated coefficients on these factors for bond funds tend to be extremely small and estimated with a great deal of statistical error. The cross-sectional regression (7) is estimated using bond fund data for every quarter in the sample period, although other frequencies may be chosen.

The annualized time-series average, $\bar{\gamma}_k$, of the quarterly cross-sectional regression coefficients (the average of the $\hat{\gamma}_{k,t}$'s) is then computed.

Estimating Factor Sensitivities for Mutual Funds

Since many mutual funds own both stocks and bonds, sensitivities to both the stock and bond market factors are estimated for the universe of mutual funds that a user may own. The methodology underlying the Forecaster and the Optimizer requires that index returns be available for a long time history. Unfortunately, historical return data on value and growth indexes prior to 1978 are not always readily available. For this reason, the VMG factor is not included in the return-generating models used by the Forecaster in this embodiment. Since return forecasts do not include a value-minus-growth factor, this factor is also excluded when estimating factor sensitivities. Since the market factor is correlated with the value-minus-growth factor, the regression coefficient on this factor—β—will capture some of the value-growth effect. Other embodiments could include a value-minus-growth factor or other factors that are considered important for explaining security returns. The following OLS regression model is estimated for each domestic mutual fund:

$$r_{i,t}-r_{f,t}=a_i+\beta_i(r_{m,t}-r_{f,t})+s_iSML_t+t_iTERM+d_iDEF+e_t. \qquad (9)$$

Because of data limitations (described below) the market capitalization factor SML is eliminated from the international mutual fund regressions in this embodiment. The following regression is estimated for each international fund:

$$r_{i,t}-r_{f,t}=a_i+\beta_i^{World}(r_{m,t}^W-r_{f,t})+t_iTERM+d_iDEF+e_t. \qquad (10)$$

In this embodiment a world market index is used to measure the equity risk premium but U.S. bond market factors are used because bond market data are not readily available for international markets.

The return data on individual securities for the mutual fund estimations are over a recent prior period, e.g., the most recent 18 to 60 monthly returns (at least 18 months and no more than 60 months). For each fund, $\hat{a}_i$, $\hat{\beta}_i$ or $\hat{\beta}_i^{World}$, $\hat{s}_i$, $\hat{t}_i$ and $\hat{d}_i$ are estimated using (9) or (10). Note that for international funds $\hat{s}_i=0$ in this embodiment. Also, the estimate $\hat{a}_i$ from the historical time-series regressions measures the historical abnormal performance on the fund and is one component of the expected alpha estimate, which is used to construct an estimate of future performance.

A measure of unsystematic risk is required to simulate the unsystematic component of return. The standard deviation of the error term $s_{e,i}$ for each security i from regression (9) or (10) is the estimate of unsystematic risk. Most statistics packages report $s_{e,i}$ in their output. (Statistics packages refer to $s_{e,i}$ by different names. Sometimes $s_{e,i}$ is called the standard error of the regression or root mean squared error.)

To adjust for taxes on expected income and capital gains distributions, a tax multiplier is estimated—see equation (17). The inputs into the tax multiplier calculation are the pre-tax and after tax return on the fund over a prior period, e.g., 3 years.

The mutual fund data file will be periodically updated, e.g., quarterly. The parameters of the expected alpha model should be periodically updated, e.g., once per year.

TABLE 2

Mutual Fund Data File

| Field | Name |
|---|---|
| 1 | Unique identifier (ticker or cusip) |
| 2 | Fund name |
| 3 | Fund category |
| 4 | $E_{1-24}(\alpha_i)$ |
| 5 | $E_{25-H}(\alpha_i)$ |
| 6 | $\hat{\beta}_i$ |
| 7 | $\hat{\beta}_i^{World}$ |
| 8 | $\hat{s}_i$ |
| 9 | $t_i$ |
| 10 | $d_i$ |
| 11 | $s_{e,i}$ |
| 12 | Tax multiplier |
| 13 | OneSource ® designation (yes or no) |

Stock Data File

The Optimizer will also input data on individual stocks. The stock data file is similar in format to the mutual fund data file, but the methodology for estimating model parameters is somewhat different.

In this embodiment the expected alpha for individual stocks is assumed to be zero. In other words, past abnormal performance—performance in excess of a benchmark model—on stocks is not extrapolated into the future. This is done because there is very little evidence in the prior art indicating that abnormal performance on stocks is predictable. However, it should be understood that an expected alpha model for stocks could be developed and incorporated here.

The sensitivity of each stock's returns to the stock market factors are estimated via the following OLS regression over a recent period:

$$r_{i,t} - r_{f,t} = a_i + \beta_i(r_{m,t} - r_{f,t}) + s_i SML_t + e_t. \quad (11)$$

International stocks are not included in the estimation in this embodiment, but given the data a similar procedure can be used to estimate parameters for these stocks. The standard deviation of the regression error term $s_{e,i}$ from the estimation of equation (11) is the estimate of unsystematic risk for the stock.

To adjust for taxes on expected income and capital gains distributions, a tax multiplier is estimated (see equation (17)). The tax multiplier has after-tax returns as one of its inputs. The inputs into the calculation of after tax returns are dividend yield and return over a prior period, e.g., the past 3 year period (see equation (20)).

The stock fund data file should be periodically updated, e.g., quarterly.

TABLE 3

Stock Data File

| Field | Name |
|---|---|
| 1 | Unique identifier (ticker or cusip) |
| 2 | Stock Name |
| 3 | $\hat{\beta}_i$ |
| 4 | $\hat{s}_i$ |
| 5 | $s_{e,i}$ |
| 6 | Dividend yield |
| 7 | Average annual historical return |

Bond Data File

The Optimizer will also input data on Treasury bonds. In this embodiment the expected alpha for individual bonds is assumed to be zero. So, like individual stocks, past abnormal performance on bonds is not extrapolated into the future. Again, an expected alpha model for Treasury bonds could be included here.

The methodology chosen to model bond returns over time depends on the assumptions that are made regarding how the user rebalances their portfolio over time. For reasons discussed below, the preferred embodiment is monthly rebalancing, although other rebalancing frequencies can be accommodated. Furthermore, it is assumed that the user maintains the maturity of their bond portfolio over the retirement horizon at its current level. For example, a user who owns an intermediate-term bond is assumed to rebalance in such a way that she holds an intermediate-term bond in each period over her entire horizon (i.e., it is not assumed that the maturity decays over time.)

As part of the pre-processing, factor sensitivities and the regression standard error are estimated for portfolios of short-, intermediate- and long-term T-bonds over a prior period, e.g., the previous 60 months. The following regression is estimated for each series:

$$r_{i,t} - r_{f,t} = a_i + t_i TERM_t + d_i DEF_t + e_t. \quad (12)$$

The standard deviation of the regression error term $s_{e,i}$ from the estimation of equation (12) is the estimate of unsystematic risk.

To assign parameters to an individual T-bond, the T-bonds in the user's portfolio are classified as short-, intermediate- or long-term. In one embodiment, short-term bonds are defined as those bonds with less than 4 years to maturity. Bonds with maturities 4 to 10 years are defined as intermediate term and bonds with 10 years to maturity and longer are classified as long-term. Obviously this is just one classification scheme and other schemes are valid.

The bond fund data file should be periodically updated.

TABLE 4

Bond Data File

| Field | Name |
|---|---|
| 1 | Asset Class (short-, intermediate, or long-term) |
| 2 | $t_i$ |
| 3 | $d_i$ |
| 4 | $s_{e,i}$ |

Cash

Cash assets should also be included in the universe of securities from which the Optimizer makes recommendations. A logical choice for cash assets is money market funds. Money market funds have different returns due primarily to differences in fund expenses. The risk of money market funds and their covariances with other assets are roughly equal. Thus, in this embodiment a single money market fund is recommended. However, additional money market funds or other assets that proxy for cash investments can be included as additional securities.

If the money market fund had no expenses, a reasonable estimate of return on this fund would be that it is equal to the return on the risk-free asset. Since it has an expense ratio, the pre-tax risk premium in this embodiment is estimated by the following:

$$r_{SMMF,t} - r_{f,t} = -\text{expense}_{SMMF}, \quad (13)$$

where $r_{SMMF,t}$ is the return on the Schwab Money Market fund.

An estimate of the expense ratio on cash for customers with cash in their 401k account is required. Since data on expense ratios for money market funds are not readily available, equation (16) is used in this case as well.

Factor Data File

The methodology used to forecast future return scenarios requires a long history of monthly observations for the factors in the factor pricing models previously discussed. In addition to the model factors, the methodology developed later requires monthly observations on inflation and on a security that proxies for the risk-free asset. Table 5 contains an exemplary factor data file.

TABLE 5

Exemplary Factor Data File

| Variable | Series |
|---|---|
| $r_f$ | US 30-day T-bill total return |
| $\pi$ | US inflation |
| $r_m$ | Large Cap Stock |
| SML | Large Cap Stock - Small Cap Stock |
| VMG | [(Large Cap Value - Large Cap Growth) + (Small Cap Value - Small Cap Growth)]/2 |
| $r_m^w$ | World ex-US |
| TERM | US Bond Horizon Premium |
| DEF | US Bond Default Premium |

Historical databases may have monthly observations on domestic series starting as early as 1926. Unfortunately, international stock return series are not typically available over such a long time frame. Instead of limiting the data to the more recent time periods where both domestic and international data are available, in this embodiment the U.S. bond market factors are used to model international bond returns, the SML factor is excluded for international funds, and the world market risk premium series is backfilled using the following approach:

1. Using regression equation (14) below, estimate $\hat{\lambda}_0$, $\hat{\lambda}_1$ and the standard deviation of the regression error term $\epsilon_t$ ($s_\epsilon$) using monthly data over the shorter time period where the world market risk premium series is available.

$$r_{m,t}^{World} - r_{f,t}^{US\ Tbill} = \lambda_0 + \lambda_1(r_{m,t}^{S\&P} - r_{f,t}^{US\ Tbill}) + \epsilon_t \qquad (14)$$

2. For each month t beginning in January 1926, substitute the actual value for $(r_{m,t}^{S\&P} - r_{f,t}^{US\ Tbill})$ and the estimates of $\hat{\lambda}_0$ and $\hat{\lambda}_1$ from step 1 into (14).

3. Draw a random variable from a mean 0 standard deviation=$s_\epsilon$ normal distribution and substitute this variable for the term $\epsilon_t$ in equation (14).

4. Repeat this process for each month during the period where world market risk premium data are not available.

The main feature of the backfilling approach is that the backfilled international series is constructed so as to insure that the correlation structure between U.S. and international stocks observed in the actual data are preserved. The approach also links the mean and variation of the international equity risk premium to that of the U.S. While the backfilling approach is no substitute for having real data, it's a good alternative to excluding all data, including domestic data, for the earlier period where the international data are not available. More recent periods, e.g., the post-1970 period, are dominated by sub-periods of extreme performance and low volatility, relative to the long-run average.

Factor Covariance File

The factor covariance matrix $\Omega$ (in this example, a 5×5 matrix) is constructed from the factor data file. It's used to construct the covariance matrix for the user's optimization problem. The T-bill and inflation series are excluded from the covariance matrix calculations. Using summation notation, the covariance between factor i and factor j, $\sigma_{f_i,f_j}$, is $$\sigma_{f_i,f_j} = \frac{\left(\sum_{t=1}^{T} f_{i,t} f_{j,t}\right) - T \bar{f}_i \bar{f}_j}{T - 1}, \qquad (15)$$

where T is the total number of observations (T is the last 60 months), $f_i$ is factor i=1, ..., 5, $f_{i,t}$ is the single element t= 1, ..., T in $f_i$, and $\bar{f}_i$ is the sample mean of $f_i$. When i=j, $\sigma_{f_i,f_j}$, where $\sigma_{f_i}^2$ is the variance of factor i. Each $\sigma_{f_i,f_j}$ is a single element in the 5×5 factor covariance matrix $\Omega$.

The factor covariance matrix $\Omega$ is more easily created using matrix algebra. Using matrix notation, $$\hat{\Omega} = \frac{f'f - T\bar{f}\bar{f}'}{T - 1}, \qquad (16)$$

where f is the T×5 factor matrix and $\bar{f}$ is the 5×1 vector of factor means.

Recommended Fund Universe File

There are two investment universes from which the Optimizer makes recommendations. The taxable universe includes those assets in the user's taxable accounts plus a Schwab determined mutual fund universe. Similarly, the non-taxable universe includes those assets in the user's non-taxable account plus a Schwab determined mutual fund universe.

When choosing a fund universe from which to recommend funds, it's important to include funds from each asset class (e.g., large-cap, small-cap, international stock, bond, and cash) and funds that are expected to perform well in the future. Doing so allows the Optimizer to recommend broadly diversified portfolios of potentially high-performing funds.

Prior research indicates that funds with good past performance and low expenses tended to perform well in the future. Schwab's mutual fund Select List™ consists of a small number of funds that have had either or both high past performance and low expenses in each of the major asset categories. Thus, the Select List™, or a subset of this list, is a good candidate to represent the fund universe. However, the Select List™ is just one example of a fund universe and any universe of funds could be used to practice this invention.

It's important that the fund universe be relatively small. The optimization problem can be solved with a large number of funds, but to insure consistent and reliable advice it is preferable to have relatively small number of funds, e.g., 50 funds. The Select List™ typically contains 80–90 funds, so it is helpful to focus on a subset of the Select List™ universe.

As a starting point, all SchwabFunds® index funds[1], OneSource® funds[2] and transaction fee funds with the exception of balanced funds, funds of funds, and any fund with a minimum investment amount above $3,000 are included. Balanced funds were eliminated because managers of these funds often make broad changes in their asset allocation. Funds of funds were eliminated because these funds do not have to report the underlying expense ratio on the funds they own. Only the expense layered on by the fund of funds itself is reported. Since the expected alpha model for mutual funds uses the expense ratio as an input, the expected alpha for these funds is measured with a great deal of error. Funds with minimum investment amounts above $3,000 were eliminated because the optimizer will not be able to solve some cases because of investment minimums. By not allowing fund with high minimums into the universe, the number of cases where the optimizer fails because of a minimum investment requirement is minimized. Schwab-Funds® that are printed in the publication but did not make the actual list are also excluded.

[1] SchwabFunds® is Schwab's proprietary mutual fund family.

[2] Schwab's Mutual Fund OneSource® service includes over 1,000 no-load mutual funds from many of America's most prominent fund families all available without transaction fees through Schwab.

This procedure may result in a universe size that is larger than preferred. The list can be paired down further in a variety of ways. One example would be to reduce the number of bond funds in the universe, because these funds tend to have similar risk/return characteristics.

The fields required for the mutual fund data file are also required for the recommended fund universe file. In addition, the minimum investment amount for initial investments in a fund held in taxable and non-taxable accounts is required. See the description of the mutual fund data file for details regarding the estimation of model parameters.

TABLE 6

Recommended Fund Universe File

| Field | Name |
| --- | --- |
| 1 | Unique identifier (ticker or cusip) |
| 2 | Fund Name |
| 3 | Fund category |
| 4 | $E_{1-24}(\alpha_i)$ |
| 5 | $E_{25-H}(\alpha_i)$ |
| 6 | $\hat{\beta}_i$ |
| 7 | $\hat{\beta}_i^{World}$ |
| 8 | $\hat{s}_i$ |
| 9 | $\hat{t}_i$ |
| 10 | $\hat{d}_i$ |
| 11 | $s_{e,i}$ |
| 12 | Tax Multiplier |
| 13 | Investment minimum taxable |
| 14 | Subsequent minimum investment taxable |
| 15 | Investment minimum non-taxable |
| 16 | Subsequent investment minimum non-taxable |
| 17 | OneSource ® designation (yes or no) |

The cash fund, the Schwab Money Market fund, is also included in the recommended fund universe. In this case, the expected alphas are set to minus the expense ratio on the Schwab money market fund, the tax multiplier is not applicable (after-tax returns can be computed with knowledge of the user's tax rate) and the OneSource® designation is yes. All other model parameters and the investment minimums are zero for cash.

Model Portfolio Data File

The Optimizer places constraints on the user's resultant asset allocation among stocks, bonds, and cash. In this embodiment the following data regarding Schwab's model portfolios are used:

TABLE 7

Schwab's Model Portfolios

| Model | % Large | % Small | % Int | % Bonds | % Cash |
| --- | --- | --- | --- | --- | --- |
| Aggressive | 40 | 25 | 30 | 0 | 5 |
| Moderately Aggressive | 35 | 20 | 25 | 15 | 5 |
| Moderate | 30 | 15 | 15 | 30 | 10 |
| Moderately Conservative | 20 | 10 | 10 | 45 | 15 |
| Conservative | 15 | 0 | 5 | 55 | 25 |

This is one example of desired asset allocations for different risk preferences. In other embodiments the number of models could be increased, the asset class list could be expanded, and/or the specific percentages could be changed.

Tax Considerations

The approach adopted in this embodiment to incorporating taxes into the portfolio problem is to consider the tax consequences of investment decisions. There are three tax sources that are considered in the investor's portfolio decision problem. First, investors may receive taxable dividend or interest income on their investments. Second, the tax consequences of the sale of securities held within a mutual fund are passed on to fund shareholders. Third, when an investor sells a taxable security, capital gains taxes are incurred. To accurately consider these taxes one only needs to keep track of tax laws affecting the long- or short-term capital gains rate. The user will be responsible for specifying their ordinary income tax rate and whether the asset is held in a taxable or non-taxable account.

Although it's possible to adjust variances and covariances for a tax effect, the preferred embodiment does not include such adjustments because they would have very little effect on variance-covariance estimates. Given the estimation error inherent in variance-covariance estimates, the added level of precision associated with adjusting these estimates for taxes seems like overkill. The existence of taxes would reduce variance calculations relative to their pre-tax levels. Moreover, the less tax efficient the asset the more the variance is reduced. Therefore, by not adjusting variances for tax effects a slight tendency towards the optimizer favoring less tax efficient assets is avoided. Other embodiments could include adjustments to the variance-covariance estimates to reflect tax effects. In the following, one embodiment for estimating after-tax returns is discussed.

Mutual Fund Distributions

There is a tax liability created from income or capital gains distributions that should be accounted for. These distributions take the form of dividends for stocks and interest for bonds. In addition to these, mutual funds also distribute short- and long-term capital gains.

A popular measure of tax efficiency is the tax efficiency ratio:

$$\text{tax efficiency} = \frac{r_i^{after-tax}}{r_i^{pre-tax}},$$

where $r_i^{pre-tax}$ is the return on the asset prior to adjusting for taxes and $r_i^{after-tax}$ is the return after adjusting for taxes. In a separate analysis, a tax efficiency measure was found to explain subsequent after-tax returns to mutual fund shareholders. Given this, it seems logical that future after-tax return could be computed by multiplying future pre-tax return and the appropriate tax efficiency ratio. Unfortunately, this approach has its shortcomings. Most importantly, the tax efficiency ratio, as it's defined above, is only applicable when both pre-tax and after-tax returns are positive. If pre-tax returns are negative, for example, the tax efficiency ratio is greater than or equal to 1. A tax efficiency ratio greater than 1 implies that after-tax returns are bigger than pre-tax returns and this cannot be the case. Yet it is important to consider tax efficiency even when pre-tax returns are negative because the after-tax returns may be even more negative.

In lieu of the tax efficiency ratio, a tax multiplier is calculated as follows:

$$TM_i = \frac{1}{(1 + r_i^{taxes})^{1/12}}, \quad (17)$$

where the annual return lost to taxes for asset i, $r_i^{taxes}$, is $$r_i^{taxes} = \frac{(1 + r_i^{pre-tax})}{(1 + r_i^{after-tax})} - 1.$$

The denominator of the tax multiplier is taken to the 1/12 power to convert the tax multiplier to a monthly figure. The tax efficiency ratio and the tax multiplier are closely related. For assets where 0<tax efficiency≦1, the rank ordering of the assets in terms of tax efficiency is the same as the rank ordering using the tax multiplier in (17). The primary advantage of using tax multiplier instead of tax efficiency is that the tax multiplier is well defined even if the pre-tax and/or the after-tax return are negative.

Note that the tax multiplier is not a function of the user's tax rate. This is the case because data vendors cannot provide after-tax return estimates on a user-by-user basis. After-tax returns are typically computed by taxing income distributions at the maximum federal tax rate of 39.6% and capital gains distributions at 20%. These percentages have changed as tax laws have changed over time. Unfortunately, vendors who report after-tax returns do not always report the split between income and capital gains distributions. In this embodiment, a simple procedure to modify the tax multiplier to make it a function of the user's tax rate is illustrated. Other embodiments may exclude this step or use another technique for making the tax multiplier a function of the user's tax rate.

Specifically, it is assumed that $r_i^{taxes}=d_i t$ where $d_i$ is the amount of the distribution for fund i and t is the tax rate. In this simple setting, $d_i$ represents the combined income and capital gain distributions and t is the weighted-average income and capital gains tax rate. To estimate $d_i$ given the after-tax return measure, an estimate for t is required. Given this, $d_i$ is given by:

$$\hat{d}_i = \frac{TM_i^{-1} - 1}{\hat{t}}. \quad (18)$$

There are a variety of ways to estimate t. However, the estimation of t should be done separately for stock and bond funds.

Given a database with historical data on fund distributions, an average of the percentage of fund distributions attributable to capital gains and income could be computed for each year during the period in which after-tax returns are measured, e.g., each year during the prior 3-year period. The maximum federal income tax rate and the capital gains tax rate over the period during which after-tax returns are measured are also recorded. In each year, t is estimated as the weighted average of the capital gains rate and the income tax rate where the weights are determined by the average of the percentage of fund distributions attributable to capital gains and income, respectively. The simple average of the yearly estimates $\hat{t}$ over the period in which after-tax returns are measured is the estimate of t used in (18).

An alternative technique for estimating t is to estimate the historical split between dividend distributions and capital gains distributions using return and dividend yield information on a benchmark index. For example, the S&P 500 index could serve as the benchmark for stocks (or just large company stocks). An estimate of the percentage of total distributions attributable to income is the dividend yield divided by total return. One minus this amount is the estimate of the percentage attributable to capital gains. Given these estimates, the procedure outlined above can be used to obtain $\hat{t}$.

The adjusted tax multiplier is then $$TM_i^a = \frac{1}{1 + \hat{d}_i(t^{oi})}, \quad (19)$$

where $t_{oi}$ is the user's combined federal and state marginal tax rate on ordinary income. This is a conservative assumption in that by using the user's tax rate on ordinary income it is assumed that all distributions are either income oriented or short-term capital gains. An alternative would be to compute a weighted average income and capital gains rate for each user using the percentages of fund distributions attributable to capital gains and dividends determined from above.

Dividend Income on Stocks

For individual stocks, after-tax return is defined as:

$$r_i^{after-tax} = r_i^{pre-tax} - t_{oi} \times \left(\frac{D}{P}\right)_i, \quad (20)$$

where $$\left(\frac{D}{P}\right)_i$$

is the annual dividend yield on stock i and $t_{oi}$ is the user's tax rate on ordinary income. Given this, the tax multiplier for stocks is calculated via (17).

After-tax Return Forecasts for Stocks and Mutual Funds

The expected return on each asset is input into the portfolio optimizer. To capture the likely impact of income and capital gains distributions over the life of the stock or fund, the following formula is used to compute the after-tax expected return for asset i:

$$E^{after-tax}[r_i]=(1+E^{pre-tax}[r_i]) \times TM_i-1. \quad (21)$$

In the Forecaster, the pre-tax return on each security i also needs to be adjusted to account for taxes in month t:

$$r_{i,t}^{after-tax}=(1+r_{i,t}^{pre-tax}) \times TM_i-1. \quad (22)$$

When the asset in question is a mutual fund, the adjusted tax multiplier given by (19) is used in (21) and (22).

After-tax Return Forecasts for T-bond and Cash Returns

In one embodiment, bond and cash returns are taxed at the user's ordinary income tax rate. In this case the expected after-tax return on bonds and cash is given by $$E[r_i^{after-tax}]=E[r_i^{pre-tax}] \times (1-\text{tax rate}). \quad (23)$$

For cash, the tax rate is the user's combined federal and state ordinary income rate $t_{oi}$. Treasury securities are exempt from state taxes, so the tax rate in this case is the user's federal tax rate $t_f$. In the Forecaster, month t pre-tax returns on T-bonds and cash are adjusted for taxes as follows:

$$r_{i,t}^{after-tax}=r_{i,t}^{pre-tax} \times (1-\text{tax rate}). \quad (24)$$

Selling a Taxable Security

For asset i, the total taxes $T_i$ resulting from the sale of all or part of the user's current holdings are given by $$T_i=V(w_{pi}-w_i)(1-c_i)t_{cg}, \quad (25)$$

where V is the dollar value of the portfolio, $w_{pi}$ is the percentage of the portfolio invested in asset i prior to the sale, $w_i$ is the "optimal" weight (or the weight after the sale takes place), $c_i$ is the cost basis of asset i (expressed relative to the current price of the security) and $t_{cg}$ is the capital gains tax rate.

These taxes reduce the current value of the user's portfolio. This reduction in portfolio value needs to be incorporated into the user's optimization problem. A method to do so is shown in the section on building the Optimizer, below.

Building the Forecaster

The goal of the Forecaster is to characterize the user's retirement age real wealth distribution (or alternatively the retirement income that this wealth could support). To do this, it is assumed that a handful of "factors" drive the performance of capital markets. In addition, security returns are modeled as a function of (1) the factor realizations (e.g., for the market factor, the actual return on a market portfolio of stocks minus the return on T-bills) (2) the asset's sensitivities to those factors, (3) a premium (positive or negative) for professional management (mutual funds only) and (4) a company- or fund-specific return surprise.

The Forecaster extracts data from four input data sets: (1) the mutual fund data file, (2) the stock data file, (3) the bond data file and (4) the factor data file. To generate a single future return scenario for a security, historical factor realizations observed at a randomly selected date during the January 1926 to present time period, a random return surprise, the security's factor sensitivities and its expected alpha are substituted into the return-generating model. To preserve the correlation structure among stocks and funds, these same factor realizations are used to construct a corresponding future return scenario for each asset in the user's portfolio. A future portfolio return scenario and an associated real wealth level are then computed. (Future savings are also included in the real wealth calculation.) This process is repeated for each month in the user's retirement horizon, yielding a single observation for the distribution of retirement age real wealth. Repeating this entire process many (e.g., 5000) times creates a retirement-age real wealth distribution. This distribution is then characterized, e.g., by reporting its mean, median, and the $5^{th}$ and $95^{th}$ percentiles. Also, statistics such as the probability that the user will meet their retirement objective can be computed.

The following is a more detailed description of the methodology underlying the Forecaster, including justification for the modeling choices and an algorithm.

Defining the Return-Generating Model.

In this section a method for using the time-series models (9)–(12) to generate future return scenarios is illustrated. Note that the models (9)–(12) are used to estimate the parameters $\hat{\beta}_i$, $\hat{\beta}_i^w$, $\hat{s}_i$, $\hat{t}_i$, $\hat{d}_i$ and $s_{e,i}$. The Forecaster uses the following model to generate future pre-tax return forecasts for each asset in a portfolio:

$$r_{i,t}=r_{f,t}+E(\alpha i)+\hat{\beta}_i(r_{m,t}-r_{f,t})+\hat{\beta}_i^w(r_{m,t}^w-r_{f,t})+\hat{s}_i SML_t+ \hat{t}_i TERM_t+\hat{d}_i DEF_t+e_{i,t} \quad (26)$$

Note that the parameters $\hat{\beta}_i$, $\hat{\beta}_i^w$, $\hat{s}_i$, $\hat{t}_i$, and $\hat{d}_i$ are not all estimated for each asset. For example, $\hat{\beta}_i^w$ is not estimated for domestic equity funds and $\hat{\beta}_i^w$, $\hat{t}_i$, and $\hat{d}_i$ are not estimated for individual stocks. Equation (26) can still be used to forecast returns as long as 0 is substituted for missing coefficients. For cash, all parameter estimates except $E(\alpha_i)$ are set to zero. Note also that $E(\alpha_i)$ is 0 for all assets except mutual funds.

For assets held within taxable accounts, the pre-tax return given by (26) is adjusted for taxes via (22) or (24). This calculation uses the tax multiplier.

Bootstrap the Model

The goal of the Forecaster is to characterize the user's retirement age real wealth distribution for a given portfolio. Of course the hope is that the derived distribution adequately characterizes the "true" distribution of retirement-age expected real wealth. For this to be the case, the return generating model (26) must do a good job characterizing the expected returns and variances on stocks and bonds. In addition, the correlation coefficients among the estimated return series for the various assets need to be good estimates of the true correlations.

The statistical properties—means, variances and correlations—of the factor return series used in (26) are the key drivers of those same properties for individual securities. The approach adopted in this embodiment for characterizing the retirement-age real wealth distribution hinges on the idea that the true distributional properties of the factor return series can be characterized by sampling from the long history of return data on the individual factors: statisticians refer to this technique as "bootstrapping." More precisely, historical factor realizations (i.e., actual factor returns) observed at a randomly selected date over the January 1926 to present time period are selected from the factor data file. Repeating this sampling technique many times insures that the statistical properties of the bootstrapped series are similar to their historical counterparts, e.g., the bootstrapped average equity risk premium is approximately equal to the average equity risk premium over the 1926 to present time period.

To generate a future return scenario for a security, the bootstrapped factor return realizations from a single random draw, a security-specific random variate, and an estimate of expected alpha are substituted into (26). Expected alpha is set at $E_{1-24}(\alpha_i)$ for the first 24 months and $E_{25-H}(\alpha_i)$ for the remaining months in the investor's retirement horizon. The security specific random return surprise is obtained by drawing a random variate from a mean 0 standard deviation=$s_{e,i}$ normal distribution.

To preserve the correlation structure among the securities in the investor's portfolio, the same bootstrapped factor return realizations are used to compute a future return scenario for each asset in the portfolio. A future portfolio return scenario and an associated real wealth level are then calculated. This process is repeated for the number of months in the user's retirement horizon, yielding a single observation for the distribution of retirement age real wealth. Repeating the process many times generates a retirement-age real wealth distribution.

There is evidence in finance literature that expected returns and variances vary over time. The methodology described thus far does not account for such variation. Properly accounting for time variation in the expected returns and variances of financial assets would have little effect on estimates of retirement-age return distribution statistics for users with long horizons. By not modeling this time variation, more precise estimates of retirement-age distribution statistics may actually be obtained because a signal-to-noise problem arising from the additional complexity brought about by modeling time variation is avoided. If shorter-term returns were being estimated or the path of the return series over time were considered important, then it might pay to accommodate time variation. Other embodiments might incorporate time-variation in expected returns and variances.

Rebalancing

The frequency with which to rebalance the portfolio must be determined. At one extreme one can choose not to rebalance, i.e., a buy-and-hold approach. Over long horizons, however, the portfolio return will be heavily influenced by assets with high expected returns (e.g., stocks), leading to extremely high estimates of future wealth. More frequent rebalancing mitigates this effect, so in this embodiment the portfolio is rebalanced monthly.

When users rebalance they may incur transactions costs and taxes. Since these costs are difficult to estimate and tend to be small they are not included in future forecasts or in the optimization. (Transaction costs and taxes incurred on recommended trades are considered. Also, estimates of after-tax returns on mutual funds do include a tax on estimated capital gains distributions.) Having said this, other embodiments might use different rebalancing assumptions and incorporate, e.g., transaction fees on rebalancing trades.

The effect of taxes associated with rebalancing on future real wealth forecasts and optimal portfolio weights can also be incorporated. However, the effects of taxes can be greatly reduced if the user: (1) uses future investment cash flows to rebalance; (2) offsets investments which increase in value with investments which decrease in value; and/or (3) does as much rebalancing as possible in non-taxable accounts. Thus, taxes associated with rebalancing are not modeled in this embodiment.

The method for allocating future cash contributions to the assets in the portfolio must also be determined. If cash contributions were spread evenly across taxable, non-taxable and 401k accounts, annual contributions could be spread so as to maintain the original investment percentages of the portfolio. Unfortunately, annual contributions to 401k accounts and other non-taxable accounts, e.g., IRA accounts, are capped. Thus, in many cases contributions cannot be spread so as to maintain the original investment percentages of the portfolio. Instead, contributions to an account are spread proportionally across the assets within each account to maintain the original allocation in that account. (Note that the forecasting logic described herein can also accommodate withdrawals—withdrawals are just negative contributions).

The Number of Simulated Paths

The optimal number of simulated future return paths is a tradeoff between accurately estimating the true distribution of future wealth and run-time efficiency. With a small number of simulations (e.g., 100) the Forecaster will execute quickly, but the true distribution of future real wealth will be estimated with a great deal of error. This estimation error is most extreme in the tails of the distribution because there are only a small number of the simulated series that end up in the tails. For example, for a sample size of 100 there are only 5 observations in each 5% tail of the distribution. Thus, it is preferable to simulate the model a large number of times. However, this is very expensive computationally.

To help determine the number of simulated paths, experiments were performed using portfolios of differing security types. The objective was to determine the number of simulated paths required for the average ending wealth value of the simulated series to converge to its expected value and to have stable outcomes in the tails of the distribution. The number of simulated paths required depends on the type of assets held in the portfolio. A test group of stocks and mutual funds were selected. For each stock selected, 15 separate simulated distributions were estimated using a number of paths that ranged between 1,000 and 22,000. For each mutual fund, 15 separate simulated distributions were estimated using a number of paths that ranged between 1,000 and 15,000. A five-year horizon was used for each simulation. This horizon was chosen because the shorter the time horizon the greater the variability in terminal wealth, thereby giving a worst-case scenario. Most investors will have a much longer horizon, so the results for those horizon lengths will be even more stable and will converge more quickly.

The analysis revealed that a stable solution for stocks was reached at 15,000 iterations; for domestic and international stock mutual funds, a stable solution was reached at 5,000 iterations; for bond funds, a stable solution was reached at 1,000 iterations.

In one embodiment 5,000 iterations is used. Another embodiment would allow the number of iterations to vary with the securities held in the portfolio.

Converting Real Wealth to Annual Income

The Forecaster estimates expected wealth, in today's dollars, at the user's horizon date. An estimate of the annual income that this portfolio could support during the user's retirement years is also reported. To avoid overwhelming the user with questions regarding their retirement investing and spending programs, a simplistic technique for converting real wealth into a lump sum is employed in this embodiment. Specifically, 4 percent of the real wealth level at the user's retirement age is the estimate of the retirement income this real wealth could support. The 4 percent number is based on a large body of practitioner literature indicating that a 4–6 percent withdrawal rate is appropriate for most investors. Other embodiments may vary the post-retirement withdrawal rate with the user's post-retirement horizon, portfolio risk, and the probability of running out of money before the user is expected to die.

Calculating the Probability of Meeting the Users Goal

For each of the 5000 future portfolio return scenarios, for example, there is an estimate of expected wealth and an associated income level in today's dollars. The distribution of annual income levels is sorted from lowest to highest. The annual income level nearest but not exceeding the investor's goal is then identified. The probability of meeting the user's goal is the rank position (1=low to 5000=high) of this annual income level divided by 5000. If the stated goal is below rank 1, then the probability is 0.

Asset Allocation

The Forecaster will also display the asset allocation of the user's portfolio. The following describes one embodiment for the asset class definitions and mappings:

Large Company Equity

Mutual funds are placed in this asset class using two methodologies:

1. Funds categorized as large- and mid-cap (includes blend, growth and value funds) are placed into this asset class.

2. Specialty funds (communications, health, technology, etc.) with median market capitalization of $1 billion or greater are also placed into this asset class.

Securities designated as domestic equity with market capitalization of $1 billion or greater are classified as large company equity.

Small Company Equity

Mutual funds are placed in this asset class using two methodologies:

1. Funds categorized as small-cap (includes blend, growth and value funds) are placed into the asset class.

2. Specialty funds (communications, health, technology, etc.) with median market capitalization less than $1 billion are also placed into this asset class.

Securities designated as domestic equity with market capitalization less than $1 billion are classified as small company equity.

International Equity

An exemplary list of categories for international equity funds are listed below:

| EXEMPLARY INTERNATIONAL EQUITY CATEGORIES |
| --- |
| DIVERSIFIED EMERGING MARKETS |
| Diversified Pacific/Asia Stock |
| Europe Stock |
| Foreign Stock |
| Japan Stock |
| Latin America Stock |
| Pacific/Asia ex-Japan Stock |
| World Stock |

American Depository Receipts ("ADR's") are classified as international equity regardless of market capitalization.

Fixed Income

An exemplary list of categories for bond funds are listed below:

| EXEMPLARY FIXED INCOME CATEGORIES |
| --- |
| High Yield Bond |
| Intermediate Government |
| International Bond |
| Long Government |
| LONG-TERM BOND |
| Multisector Bond |
| Muni National Intermediate |
| Muni National Long |
| Muni Short |
| Muni Single State Intermediate |
| Muni Single State Long |

| -continued |
| --- |
| EXEMPLARY FIXED INCOME CATEGORIES |
| Short Government |
| Short-term Bond |
| Emerging Markets Bond |
| Municipal NY Intermediate |
| Municipal New York Long Term |
| Municipal California Intermediate |
| Ultrashort Bond |
| Municipal California Long Term |

Individual debt securities (e.g. corporate bonds, government bonds, etc.) are classified by debt type. See Table 8 for specific security categorization.

Cash

All funds held in cash and money market funds are placed in this asset class.

Other

Funds in this group might include

| EXEMPLARY OTHER CATEGORIES |
| --- |
| Convertibles |
| DOMESTIC HYBRID |
| International Hybrid |

In addition, individual items such as warrants, rights, options and convertible securities are also placed in this asset class. See Table 8 for specific security categorization.

TABLE 8

Exemplary Asset-Class Categorization of Securities

| Security Type | Asset Class |
| --- | --- |
| Money Market Instruments | Cash |
| Commercial Paper | Cash |
| Bankers Acceptance | Cash |
| Certificate of Deposit | Cash |
| Money Market | Cash |
| Preferred Money Market/Muni Preferred | Cash |
| Money Market Fund | Cash |
| Reorganized Equity Security | Equity |
| When Issued Equity Security | Equity |
| User Defined Equity | Equity |
| Open Ended Mutual Fund | Equity |
| Equity | Equity |
| Real Estate Investment Trust | Equity |
| Stock | Equity |
| Common Stock | Equity |
| Preferred Stock | Equity |
| Convertible Preferred Stock | Equity |
| Cumulative Convertible Preferred Stock | Equity |
| Corporate Bond | Fixed Income |
| Corporate Bond Coupon | Fixed Income |
| Corporate Bond Convertible | Fixed Income |
| Corporate Bond Original Issue Discount | Fixed Income |
| Mortgage Backed Security | Fixed Income |
| Government Agency Coupon | Fixed Income |
| Private Debt (No Secondary Market) | Fixed Income |
| Private Debt Convertible | Fixed Income |
| Government Agency | Fixed Income |
| Government Agency Original Issue Discount | Fixed Income |
| Government Agency Discount | Fixed Income |
| Collateralized Mortgage Obligation | Fixed Income |
| Mortgage Backed Pass-through | Fixed Income |
| Reorganized Debt Security | Fixed Income |
| When Issued Debt Security | Fixed Income |
| User Defined Debt | Fixed Income |

TABLE 8-continued

Exemplary Asset-Class Categorization of Securities

| Security Type | Asset Class |
|---|---|
| Debt | Fixed Income |
| Asset Backed Security | Fixed Income |
| Municipal Bond | Fixed Income |
| Municipal Bond Coupon | Fixed Income |
| Municipal Bond Original Issue Discount | Fixed Income |
| Bond Fund | Fixed Income |
| Treasury (Government Debt) | Fixed Income |
| Treasury Bill | Fixed Income |
| Treasury Strip | Fixed Income |
| Treasury Coupon | Fixed Income |
| American Depository Receipt | International Equity |
| Option | Other |
| Foreign Currency Option | Other |
| Index Option | Other |
| Broad Based Index Option | Other |
| Narrow Based Index Option | Other |
| Insurance | Other |
| Real Estate | Other |
| User Defined | Other |
| Index Master | Other |
| Unit Investment Trust | Other |
| OCC Pledged Security | Other |
| Basket | Other |
| Future | Other |
| Limited Partnership | Other |
| Derivative | Other |
| Commodity | Other |
| Right | Other |
| Warrant | Other |
| Closed End Mutual Fund | Other |

Short positions are excluded from calculation of the asset allocation.

Algorithm

This algorithm is meant to serve as an example for how the Forecaster may be programmed. The algorithm implemented by one of skill in the art could vary, e.g., in order to increase the speed of the product.

1. For each account (taxable, non-taxable and 401k), set $V_{a,t-1}=V_a$, where $V_a$ is the current total dollar value of the securities within an account a. (Note that when the Forecaster is run for an optimal portfolio, $V_{taxable}$ must be reduced by the total dollar value of all capital gains taxes paid on recommended sell transactions and the total dollar value of all transactions costs.)

2. For each account, set the weights invested in each asset to their initial value. When the forecast is being computed for the user's initial portfolio, the weights are set to those based on the user's original holdings. When the forecast is being computed for the optimal portfolio, the weights are set based on the optimal portfolio.

3. For each month t=1, . . . , retirement month,
   a. Randomly select a month u from the January 1926–present time period using a random number generator for a uniform distribution.
   b. For each account type:
      (1) For each security within an account type:
         (A) Substitute the factors for month u, including $r_{f,u}$, into (26).
         (B) Substitute the security's estimates of the factor sensitivities into (26). If <18 months of return data exist, then exclude that security.
         (C) For mutual funds, if $t \leq 24$, then substitute $E_{1\text{-}24}(\alpha_i)$ into (26). Otherwise, substitute $E_{25\text{-}H}(\alpha_i)$ into (26). For stocks and T-bonds, set $E(\alpha_i)=0$.
         (D) Draw a random variable from a mean 0 standard deviation=$s_{e,i}$ normal distribution.
         (E) Substitute this random variable for $e_{i,t}$ in (26). If the security is held in a taxable account, then adjust the pre-tax return using equation (22) or (24).
      (2) Compute the portfolio return within an account:

$$r_{a,t} = \sum_{i=1}^{N} w_{a,i} r_{i,u},$$

where $r_{a,t}$ is the portfolio return on the account at time t, N=the number of securities in the account and $w_{a,i}$ is the weight of security i in account a.
      (3) Adjust the return for inflation:

$$r_{a,t}^{real} = \frac{1+r_{a,t}}{1+\pi_u} - 1,$$

where $\pi_u$ is the month u inflation rate.
      (4) Compute end-of-period real wealth: $V_{a,t}=V_{a,t-1}(1+r_{a,t}^{real})$+cash contribution to that account.
      (5) Store $V_{a,t}$.

4. Add the end-of-horizon $V_{a,t}$'s.

5. Repeat steps 1–4, e.g., 5,000 times.

6. Compute distributional statistics for end-of-period wealth and retirement income: median, $5^{th}$ percentile and $95^{th}$ percentile.

7. Compute the probability of meeting the goal as outlined above.

The Optimizer

In its simplest form, the portfolio optimization problem is to maximize expected return for a specific level of variance. Portfolio optimization is widely used in the pension fund industry where personal taxes are not considered. Different optimization routines are typically distinguished by their choice of modeling techniques for expected returns and the covariance matrix and by the constraints placed on the problem. The main distinguishing feature of the optimizer developed herein is that an optimal portfolio is obtained for an investor who currently holds securities in both a taxable and non-taxable account.

Methodology

In this section the methodology for undertaking a tax sensitive portfolio optimization is displayed. The presence of taxes dramatically increases the complexity of the optimization problem, relative to the no-tax case. Specifically, the tax effect associated with capital gains or losses on securities is considered only in the case where securities are sold in a taxable account. Important implications of this are that the first derivative of the objective function is discontinuous; and that the objective function is a non-linear, and non-quadratic, function of the optimal weights. Moreover, the expected return on each asset depends on whether it's held in a taxable or non-taxable account. Because of the dual account nature of the problem, the optimizer must determine the allocation of funds within each account type, effectively doubling the number of parameters that must be estimated in the complete taxable case versus the case where no taxes are considered at all.

Because the desire is for the solution to be tax sensitive and because a number of constraints are being imposed, nonlinear programming (NLP) will be required. The advantage of nonlinear optimization is that virtually any model can be specified, regardless of its functional form. There are two primary disadvantages:

1. Nonlinear optimization is computationally expensive, since the functions involved may need to be evaluated hundreds or even thousands of times before the solution can be identified. The computational time required to solve the taxable case is also longer than that required to solve the no-tax case because there are twice as many parameters that need to be estimated in the taxable case.
2. Portfolio problems have very flat functions that are being optimized. In this situation the optimization will at times struggle to find an optimum. Thus, algorithms for what to do in the case where the optimizer stalls on a flat surface may need to be developed. It's also possible that the NLP routine will fail. Thus, this approach needs to be supported with error reporting mechanisms.

In spite of these limitations, the optimization problem solved here is so general that this method should be adopted. To resolve the flat function problems identified in 2 above, an iterative solution algorithm is developed. This solution involves conditionally seeding the NLP routine with different starting conditions and, in the event that problems still exist, running the NLP again using information gathered from previous runs. An iterative procedure to incorporate investment minimums is also developed. The iterative procedure incorporates investment minimums without seriously hampering run-time efficiency.

In the remainder of this section, a methodology for estimating expected pre-tax returns on the assets included in the optimization is developed first. Second, a technique for estimating the variance/covariance matrix without having to store the time-series of observations on each asset that might be included in the user's portfolio is shown. Third, the tax sensitive portfolio optimization problem is set up. Fourth, the iterative NLP solution technique is described.

Estimating the Expected Pre-Tax Return on Each Individual Asset

An estimate of the pre-tax return for each asset in the portfolio is needed. The methodology for computing pre-tax expected return is illustrated using domestic stocks.

The expected rate of return on each security in the user's portfolio is found by first applying the expectations operator to (9)–(12). In the case of domestic stocks, for example, applying the expectations operator to (11) yields $$E(r_i) = E(r_f) + a_i + \beta_i E(r_m - r_f) + s_i E(SML).$$

The unexpected return component $e_{i,t}$ in (11) disappears because the expected value of this variable is zero. Estimates of $a_i$, $\beta_i$, $s_i$, $E(r_f)$, $E(r_{m,t} - r_{f,t})$ and $E(SML_t)$ are required to estimate expected return. The estimates of $\beta_i$ and $s_i$ are the OLS estimates $\hat{\beta}_i$ and $\hat{s}_i$, respectively. The coefficient $a_i$ is meant to measure the expected abnormal performance on the security. This measure of abnormal performance is the security's $E(\alpha_i)$, which is zero for stocks in this embodiment. The risk-free rate, market risk premium and the small-minus-large market capitalization premium are estimated using the long run time series average of these series $\bar{r}_f$, $\overline{r_m - r_f}$ and $\overline{SML}$, respectively. Making these substitutions yields the following formula for determining the pre-tax expected risk premium on individual domestic stocks:

$$E_{stocks}^{pre-tax}(r_i) = \bar{r}_f + \hat{\beta}_i \overline{r_m - r_f} + \hat{s}_i \overline{SML},$$

where $\overline{r_m - r_f}$ and $\overline{SML}$ are computed using the domestic versions of these series.

For mutual funds an estimate of $E(\alpha_i)$ is required. As noted above, after year 2 $E(\alpha_i)$ is set to minus the expense ratio. [See the discussion of equation (3).] The optimizer needs a single input for $E(\alpha_i)$. The following formula yields the average $E(\alpha_i)$ over the investor's retirement horizon H (in months):

$$E(\alpha_i) = \{[1 + E_{1-24}(\alpha_i)]^{24/H} [1 + E_{25-H}(\alpha_i)]^{1-24/H}\}^{1/H} - 1, \quad (27)$$

where $E_{1-24}(\alpha_i)$ is the expected $\alpha$ over the first 24 months of the user's retirement horizon and $E_{25-H}(\alpha_i)$ is the expected $\alpha$ over the remaining months.

In general, the expected pre-tax return on any asset in this embodiment can be written as the following:

$$E^{pre-tax}(r_i) = \bar{r}_f + E(\alpha_i) + \hat{\beta}_i \overline{r_m - r_f} + \hat{\beta}_i^w \overline{r_m^w - r_f} + \hat{s}_i \overline{SML} + \hat{t}_i \overline{TERM} + \hat{d}_i \overline{DEF}. \quad (28)$$

Note that for each security $\hat{\beta}_i$ or $\hat{\beta}_i^w$ will be zero. For many assets more than one factor sensitivity will be zero. Also, $E(\alpha_i)$ is non-zero for mutual funds only.

Estimating the Covariance Matrix

A method for estimating the covariance matrix without using the time-series of observations for each security is illustrated in this section. Given such a method, it is not necessary to store the time-series of observations for each of the assets that might enter the user's portfolio decision problem.

Assume that a K-factor model of the type defined in (9)–(12) describes the returns to all securities. [Model (9), for example, is a 4-factor model.] Let $\Omega$ be a K×K factor covariance matrix, where $\sigma_{f_i f_j}$ (the covariance between factor i and factor j) denotes the i,j$^{th}$ element of $\Omega$. When i=j, then $\sigma_{f_i f_i} = \sigma_{f_i}^2$—the variance of the monthly returns on the i$^{th}$ factor. Furthermore, let $\Sigma$ be the N×N covariance matrix of the individual securities/positions included in the user's investment opportunity set. It is the covariance matrix $\Sigma$ that is relevant for the user's optimization problem.

The individual elements $\sigma_{i,j}$ in $\Sigma$ can be constructed without the sample time-series using the K-factor model. Define F to be the N×K matrix of factor sensitivities for N securities estimated from the K factors, $f_i$, is the sub-vector of factor sensitivities for security i in F and $f_{i,j}$ a single element in $f_i$ (e.g., $\hat{\beta}_i$, $\hat{\beta}_i^{World}$, $\hat{s}_i$, $\hat{t}_i$ and $\hat{d}_i$). The i,j$^{th}$ element of $\Sigma$ is:

$$\sigma_{i,j} = f_{i,1} f_{j,1} \sigma_{f_1}^2 + f_{i,2} f_{j,2} \sigma_{f_1 f_2} + \ldots + f_{i,K} f_{j,K} \sigma_{f_K}^2 + \sigma_e^2, \quad (29)$$

where the final variance term equals zero except when i=j. Or, using matrix notation:

$$\sigma_{i,j} = f_i' \Omega f_j + \sigma_e^2, \quad (30)$$

where the final variance term equals zero except when i=j. To construct the user-specific covariance matrix $\Sigma$ in the example outlined in this embodiment, 1. Define the factor covariance matrix $\Omega$ to be a 5×5 (K=5) factor covariance matrix. Note that this covariance matrix includes both the U.S. and International stock market factor. For each security, either $\hat{\beta}_i = 0$ or $\hat{\beta}_i^{World} = 0$. For many assets more than one factor sensitivity will be zero. For example, an international mutual fund will have $\hat{\beta}_i = 0$ and $\hat{s}_i = 0$.

2. For i=1, . . . N, j=1, . . . N, use (29) or (30) to compute the individual element $\sigma_{i,j}$ in $\Sigma$.

3. If i=j, the estimate $s_{e,i}^2$ for security i is $\sigma_e^2$.

Asset Allocation Constraints

Asset allocation is a widely accepted tenet of modern finance and it is the foundation of Schwab's current investment advice philosophy. At the core of Schwab's asset allocation advice are the asset allocation percentages of the five model portfolios listed in Table 7. In the present embodiment the optimization problem is constrained to insure that each investor's resulting asset allocation is roughly consistent with one of the five model portfolios. The constraints do two things. Most importantly, they help to insure that recommended portfolios are diversified across asset categories. Thus, they help reduce the well-known tendency of optimizers to heavily recommend a single security with either an unusually high expected return or an unusually low variance. In addition, the constraints help to insure consistency with asset allocation models currently in existence.

As an example, consider an investor who is classified as aggressive. The resultant asset allocation of the optimal portfolio is constrained to be roughly equal to the aggressive model portfolio allocations. More precisely, with the exception of cash the portfolio asset allocation is constrained to the percentages given in Table 7, plus or minus 5%. Cash is constrained to the corresponding asset allocation percentage plus or minus 1%. Since cash assets should be liquid, cash is forced into the taxable account to the extent possible. For example, if a customer has $10,000 of discretionary funds in her taxable account and the asset allocation constraint on cash implied that her overall cash position should be this amount or less, then her cash position would be held entirely within the taxable account. If the required cash position exceeded $10,000, then the remaining cash holdings would be held within the non-taxable account.

In this embodiment, we do not make buy or sell recommendations of assets held within 401(k) or 403(b) accounts nor do we make buy or sell recommendations for individual stocks or treasury bonds. These constraints, however, may be relaxed in other embodiments.

To insure that there is a feasible space over which a solution can be obtained to each optimization problem, the asset allocation constraints apply to that component of the portfolio that the Optimizer can make recommendations. In other words, if the user holds 60% of her portfolio in individual stocks, for example, the asset allocation constraints apply to the remaining 40% of the portfolio. This is just one example of how to apply the asset allocation constraints in such a way as to insure a feasible space.

The model portfolio concept is also helpful for communicating and specifying the user's risk tolerance. The user's optimization problem is solved for one of five different risk-return combinations based on the user's chosen attitude towards risk. These choices are labeled conservative, moderately conservative, moderate, moderately aggressive and aggressive following existing practice at Schwab. The decision to use five risk-return combinations and label them in this way is based on the following factors:

Risk is a difficult concept to convey, which makes the decision regarding labeling the user interface very important from a user experience perspective. Schwab's asset allocation models are the foundation of Schwab's existing advice platform. Customers and branch representatives are familiar with the model names: conservative, moderately conservative, moderate, moderately aggressive and aggressive. These names are also good names for characterizing the user's attitude towards risk.

The risk-return combinations on the efficient frontier—the set of portfolios offering the highest expected return for a given level of risk—are estimates. As such, they are subject to estimation error. By having too many risk positions, there is a risk that the user will focus on differences in portfolio composition that are not meaningful. By keeping the number of risk positions small the user's attention is focused on portfolios that are more likely to truly reflect different expected risk-return combinations.

The five risk-return combinations are determined by the asset allocation percentages corresponding to the five Schwab model portfolios. (See Table 7 for these percentages.) Therefore, the optimization problem can be solved for each model portfolio yielding five distinct sets of portfolio weights that represent alternate risk-return combinations.

Setting Up the Optimization Problem

A key feature of a tax sensitive portfolio optimizer is that the expected return of each asset in the user's investment opportunity set depends on whether the asset is held in a taxable or non-taxable account. There are different approaches to setting up the optimization problem for this case. One embodiment is illustrated in this section. It will be apparent to those who have ordinary skill in the art that there are alternate ways to set up the optimization. What is common to these methods is that each requires an estimate of the amount of the asset to hold in the taxable account and the amount to hold in the non-taxable account. This implies that two parameters must be estimated for each asset included in the universe. The approach to this estimation problem adopted in this embodiment is to fold out the investor's universe. That is, each asset enters the universe once if it can be held in a taxable account and again if it can be held in a non-taxable account.

In the remainder of this section, the specific steps taken to set up a tax sensitive portfolio optimization are outlined.

1. Combine multiple positions. Within each account—taxable, non-taxable and 401(k)—aggregate multiple positions in a single asset into 1 position. For example, suppose there are two positions in mutual fund XYZ in a taxable account, 3 positions of that same fund in a non-taxable account, and 1 position in a 401k account. The two positions in the taxable account are rolled into 1 position by combining the shares in each position. Similarly, the 3 positions in the non-taxable account are combined into 1 position. Following this process, there are now 3 positions in fund XYZ instead of 6—one position within each account type. The primary advantage of combining assets into single positions is that run-time efficiency is improved because the number of parameters that must be estimated in the optimization process is kept to a minimum.

2. Determine the assets to be included in the user's optimization universe.

Within the taxable account, include: those assets that the customer holds in that account; those assets in the recommended fund universe file that customer does not already own; and the cash asset.

Within the non-taxable account, include: those assets that the customer holds in that account; those assets in recommended fund universe file, with the exception of municipal bond funds, that customer does not already own; and the cash asset.

Include those assets held within a 401k in the non-taxable universe.

Define N as the number of assets in the universe.

Note that this method of folding out the universe implies that the number of parameters that the optimizer must estimate is at least two times the number of funds in the recommended fund universe. (An equivalent method for estimating investment percentages in taxable and non-taxable accounts is to include a second parameter measuring the percentage of the security to be held in the taxable/non-taxable account for each security that can be held in both types of accounts. The number of parameters to be estimated is the same under both of these methods.)

3. Group assets within each account by constraint type.

Group 1: The non-cash assets held in the taxable account where a buy or sell can be recommended. Define $N_1$ as the number of assets in this group.

Group 2: The non-cash assets held in the taxable where only a sell can be recommended. Define $N_2$ as the number of assets in this group.

Group 3: The cash asset(s) held in the taxable account. Define $N_3$ as the number of assets in this group. Note that $N_3=1$ in this embodiment.

Group 4: The assets held in the taxable account where neither a buy nor a sell can be recommended (e.g., stocks and T-bonds). Define $N_4$ as the number of assets in this group.

Group 5: The non-cash assets held in the non-taxable account where a buy or sell can be recommended. Define $N_5$ as the number of assets in this group.

Group 6: The nom-cash assets held in the non-taxable account where only a sell can be recommended. Define $N_6$ as the number of assets in this group.

Group 7: The cash asset(s) held in the non-taxable account. Define $N_7$ as the number of assets in this group. Note that $N_7=1$ in this embodiment.

Group 8: The assets held in the non-taxable account where neither a buy nor a sell can be recommended (e.g., stocks, T-bonds, and 401k assets). Define $N_8$ as the number of assets in this group.

Note that $$N = \sum_{i=1}^{8} N_i.$$

4. Construct the recommended asset universe. The 8 groups listed above combine to form the recommended universe of assets. For purposes of exposition, the universe is arranged in such a way that the group 1 positions are at the top and group 8 positions are on the bottom. Obviously, this sorting method is only one way in which a mapping between the recommend asset universe and optimal investment amounts can be created.

5. Dynamically determine cost basis equation for each asset held in a taxable account To do this, sort lots in security i held in the taxable account from highest cost basis to lowest.

| Lot | Cost basis | Current # of shares | Current Price |
|---|---|---|---|
| 1 | $c_1$ (highest) | $s_1$ | $P_i$ |
| . | . | . | |
| . | . | . | |
| . | . | . | |
| L | $c_L$ (lowest) | $s_L$ | |

Define the number of shares sold as:

$$x_i = \frac{V[\max(w_{pi} - w_i, 0)]}{P_i},$$

where V is the value of the portfolio, $w_{pi}$ is the weight of asset i in the original portfolio, and $w_i$ is the optimal weight. The cost basis can then be written as a function of the optimal weights:

$$c_i = \min(s_1, x_i) \cdot c_1 + \min[s_2, \max(x_i - s_1, 0)] \cdot c_2 + \ldots + \min[s_L, \max(x_i - s_1 - s_2 - \ldots - s_L, 0)] \cdot c_L \quad (31)$$

In this embodiment the position with the highest cost basis should be sold first. Other embodiments may consider alternate conventions such as first-in-first-out.

6. Determine the asset allocation boundaries. Define the 6×1 vector b of asset allocation percentages for the model portfolio corresponding to the user's chosen level of risk:

$$b = \begin{bmatrix} b_1 \\ \vdots \\ b_6 \end{bmatrix},$$

where: $b_1$ corresponds to the percent allocated to asset class 1, defined as large cap; $b_2$ corresponds to the percent allocated to asset class 2, defined as small-cap; $b_3$ corresponds to the percent allocated to asset class 3, defined as international; $b_4$ corresponds to the percent allocated to asset class 4, defined as bonds; $b_4$ corresponds to the percent allocated to asset class 5, defined as cash; and $b_4$ corresponds to the percent allocated to asset class 6, defined as other. Note that $b_{6=0}$ for each model portfolio. These percentages are taken from Table 7. Also, define the vector of plus-minus percentages as $$p = \begin{bmatrix} p_1 \\ \vdots \\ p_6 \end{bmatrix}.$$

In this embodiment $p_1=1\%$ and all other values for p are set to 5%. Note that the values in p imply that the asset allocation percentages are allowed to vary by plus or minus 5% for all asset classes except cash, which is only allowed to deviate by plus or minus 1%.

7. Define the weight vector and determine initial investment percentages. The vector of optimal investment percentages—or weights—corresponding to the user's asset universe is represented by the following:

$$w = \begin{bmatrix} w_1 \\ \vdots \\ w_N \end{bmatrix}.$$

$$\left(\text{Note that } w_i = \frac{\$ \text{ amount invested in position } i}{V}.\right)$$

The vector of initial investment percentages is similarly defined as $$w_p = \begin{bmatrix} w_{p1} \\ \vdots \\ w_{pN} \end{bmatrix},$$

where $w_{pi}$ is the user's current investment percentage in position i.

8. Determine discretionary investment percentages in taxable and non-taxable accounts. For group 4 and group 8 assets the optimization is constrained so that no buy or sell recommendation is made. This means that in many cases the optimizer will have discretion over less than 100% of the total portfolio. If $N_1+N_2+N_3>0$, then the percent of discretionary money in the taxable account is defined as $$D_{tax} = \sum_{i=1}^{N_1+N_2+N_3} w_{pi};$$

otherwise, $D_{tax}=0$. Similarly, if $N_5+N_6+N_7>0$, the percent of discretionary money in the non taxable is defined as $$D_{non-tax} = \sum_{i=N_1+N_2+N_3+N_4+1}^{i+N_5+N_6+N_7-1} w_{pi};$$

otherwise $D_{non-tax}=0$.

9. Determine the upper and lower boundaries on the portfolio weights. In traditional optimization problems each weight on the N assets in the universe is typically allowed to vary between zero and one. This insures that only long positions in the asset are considered. The upper and lower boundaries on the portfolio weights can be further restricted in this problem, improving the run-time efficiency of the product. The weights within the 8 groups of assets are constrained as follows:

Group 1: For each $w_i$, i=1, . . . , $N_1$, $0 \leq w_i \leq D_{tax}$. The weights on group 1 assets are constrained so they can not exceed the discretionary amount in the taxable account.

Group 2: For each $w_i$, $$i = 1+N_1, 2+N_1, \ldots, \sum_{i=1}^{2} N_i,$$

$0 \leq w_i \leq w_{pi}$. This set of constraints guarantees that the optimizer will not recommend a buy on a group 2 asset.

Group 3: For each $w_i$, $$i = 1+\sum_{i=1}^{2} N_i, 2+\sum_{i=1}^{2} N_i, \ldots, \sum_{i=1}^{3} N_i,$$

$0 \leq w_i \leq C_{UB}$, where the cash upper boundary $C_{UB}$ is set as follows: $C_{UB}=(b_1+p_1)(D_{tax}+D_{non-tax})$. (One could set the cash upper boundary to $C_{UB}=\min\{(b_1+p_1)(D_{tax}+D_{non-tax}), D_{tax}\}$ if it is more efficient to do so.) The cash upper boundary is set to take advantage of the fact that the model portfolio percentages can be used to constrain the weight even further than would be the case without these constraints. The upper boundary calculation includes non-taxable cash because cash is being forced into the taxable account whenever possible.

Group 4: For each $w_i$, $$i = 1+\sum_{i=1}^{3} N_i, 2+\sum_{i=1}^{3} N_i, \ldots, \sum_{i=1}^{4} N_i,$$

$w_i=w_{pi}$. This constraint insures that a group 4 position will remain fixed in the user's portfolio.

Group 5: For each $w_i$, $$i = 1+\sum_{i=1}^{4} N_i, 2+\sum_{i=1}^{4} N_i, \ldots, \sum_{i=1}^{5} N_i,$$

$0 \leq w_i \leq D_{non-tax}$. The weights on group 5 assets are constrained so they can not exceed the discretionary amount in the non-taxable account.

Group 6: For each $w_i$, $$i = 1+\sum_{i=1}^{5} N_i, 2+\sum_{i=1}^{5} N_i, \ldots, \sum_{i=1}^{6} N_i,$$

$0 \leq w_i \leq w_{pi}$. This set of constraints guarantees that the optimizer will not recommend a buy on a group 6 asset.

Group 7: Cash is placed in the taxable account whenever it is possible to do so. To accomplish this, the upper boundary on non-taxable cash is determined as a function of the upper boundary on taxable cash. Define the upper boundary on non-taxable cash to be $C_{UB,non-tax}$. For each $w_i$, $$i = 1+\sum_{i=1}^{6} N_i, 2+\sum_{i=1}^{6} N_i, \ldots, \sum_{i=1}^{7} N_i,$$

$0 \leq w_i \leq C_{UB,non-tax}$, where $C_{UB, non-tax cash}=0$ if $C_{UB} \leq D_{tax}$, i.e., the upper boundary on total cash is less than or equal to the percent of discretionary funds in the taxable account. Otherwise, $C_{UB,non-tax}=C_{UB}-D_{Tax}$, i.e., the upper boundary on non-taxable cash is equal to the upper boundary on total cash minus the amount of discretionary funds in the taxable account.

Group 8: For each $w_i$, $$i = 1+\sum_{i=1}^{7} N_i, 2+\sum_{i=1}^{7} N_i, \ldots, \sum_{i=1}^{8} N_i,$$

$w_i=w_{pi}$. This constraint insures that group 8 positions will remain fixed in the user's portfolio.

It is possible to pare down the upper boundaries on some of the assets even more by taking advantage of what is known about the asset allocation constraints.

10. Create the matrix of asset allocation weights. Define the N×6 matrix a containing the asset class weights of each of the N assets in each asset class j as $$a = \begin{bmatrix} a_{11} & \cdots & a_{16} \\ \vdots & & \vdots \\ a_{N1} & \cdots & a_{N6} \end{bmatrix}.$$

If i is a group 4 or group 8 position, the individual elements $a_{ij}$, j=1, ..., 6 in a are set to 0. This implies that the style of each of these assets is not considered in the asset allocation constraint. If i is not in group 4 or group 8, the individual element $a_{ij}$, j=1, ..., 6 in a is set to 1 if the asset belongs to asset class j and 0 for all other elements. The 6×1 vector a'w contains the asset class weights for each of the 6 asset classes.

11. Calculate pre-tax expected return. For each asset N in the fund universe, determine $E^{pre-tax}[r_i]$—the pre-tax expected rate of return—using (28).

12. Calculate returns after taxes on distributions. For group 1–4 positions, calculate $E^{pre-cap.\ gain}[r_i]$—the return after adjusting for expected taxes on subsequent distributions but before capital gains taxes—using (21) or (23).

13. Setup expected return vector. Define the N×1 vector of expected returns as $$r = \begin{bmatrix} E^{pre-cap.gain}[r_1] \\ \vdots \\ E^{pre-cap.gain}[r_{N_1+N_2+N_3+N_4}] \\ E^{pre-tax}[r_{N_1+N_2+N_3+N_4+1}] \\ \vdots \\ E^{pre-tax}[r_{N_1+N_2+N_3+N_4+1}] \end{bmatrix}.$$

14. Set up matrix to determine capital gains/losses. When an asset that the user currently owns is sold a capital gain or loss is incurred. To capture this tax effect first define $$\Delta_w = \begin{bmatrix} \max(w_{p1} - w_1, 0) \\ \max(w_{p2} - w_2, 0) \\ \vdots \\ \max(w_{pN} - w_N, 0) \end{bmatrix}.$$

$\Delta w$ is an N×1 vector where each element takes on the value $w_{pi}-w_i$ when a sale of that security takes place in the taxable account or 0 otherwise. In addition, define the N×1 vector 1-c that contains 1 minus the cost basis for each position:

$$1-c = \begin{bmatrix} 1-c_1 \\ 1-c_2 \\ \vdots \\ 1-c_N \end{bmatrix}.$$

When asset i is not held or it's held in a non-taxable account, set $c_i=1$.

The total dollar tax T incurred due to selling securities in the user's portfolio is given by $$T=t_{cg}\times\min\{V[(1-c)'\Delta_w], 0\}, \tag{32}$$

where $t_{cg}$ is the capital gains tax rate. In this embodiment capital losses on assets are allowed only to the extent that these losses in aggregate are offset by capital gains. That is, the amount of income that can be offset is set to zero. The tax laws currently allow for a net loss of $3,000 to be offset against ordinary income in a given year. Moreover, additional losses can be carried forward. A user's ability to take advantage of these losses for tax purposes is influenced, among other things, by the level of taxable income. Since it is difficult to estimate the benefits of selling assets at a net loss, the conservative assumption that no benefits are received is adopted in this embodiment. This assumption has the effect of discouraging the sale of assets for the purpose of realizing a capital loss. Another embodiment would be to cap the net amount at $3,000 instead of 0. The drawback of this is that the user may use the product within the same year and (32) would again allow a $3,000 deduction.

15. Account for transaction costs. At Schwab, transaction fees are levied on mutual fund buys/sells for funds not in the mutual fund OneSource® program. Expected portfolio return should be adjusted for these fees, commissions on stocks, and commissions on Treasury bonds. Transaction fees for non-OneSource® funds at Schwab are as follows:

0.7% of assets for amounts below $15,000, with a $39 minimum.

0.2% of assets for amounts at or above $15,000 plus 0.7% for the first $14,999, not to exceed a max of $149.

Unfortunately, precisely modeling this pricing structure within the optimization is extremely cumbersome because a fund can be held in multiple accounts and fund purchases within each account are a separate transaction. This means that the size of the transaction fee depends on the purchase amount in each account. Modeling this would have a deleterious affect on product performance. To avoid this, in this embodiment the transaction fee for each mutual fund i is modeled as $$g_i^{fund}=\max[\min(d_i\times V_0\times|w_{pi}-w_i|\times 0.007, d_i\times 149), d_i\times 39], \tag{33}$$

where $d_i$ takes on the value of 1 if the fund is non a OneSource® fund and 0 if it is a OneSource® fund. Note that this formula is applicable for fund sales as well as fund purchases.

Stock commissions at Schwab vary based on the medium used to make the trade—phone, branch or web—and the number of trades an investor makes in a month. Since the preferred embodiment of this product is a web-based tool and is designed for long-term buy-and-hold type investing, the standard web commission fees of $29.95 per trade or $0.03 per share for trades over 1000 shares is used. Define the total number of shares for a stock position i as $S_i$. Commissions on stocks are modeled as follows:

$$g_i^{stock}=\max(S_i\times|w_{pi}-w_i|\times 0.03, 29.95), \tag{34}$$

Commissions on Treasury bonds at Schwab are a flat $49 per transaction. Therefore, if position i is a T-bond, then $$g_i^{T-bond}=49. \tag{35}$$

Given these definitions of $g_i$, the total dollar value of all transaction fees are $$G=g'1, \tag{36}$$

where g is an N×1 vector containing the $g_i$'s and 1 is an N×1 vector of ones.

16. Calculate after-tax portfolio return. First, recognize that the expected portfolio return pre-capital gain taxes $E^{pre-cap\ gain}[r_p]$ is $$E^{pre-cap\ gain}[r_p] = w'r.$$

The expected portfolio return after all taxes $E^{after-tax}[r_p]$ is $$E^{after-tax}[r_p] = \left[\left(\frac{V-T-G}{V}\right)(1 + E^{pre-cap\ gain}[r_p])^H\right]^{\frac{1}{H}} - 1$$

$$= \left(\frac{V-T-G}{V}\right)^{\frac{1}{H}}(1 + w'r) - 1,$$

where H is the total number of months in the user's investment horizon.

17. Compute the variance-covariance matrix. Follow the steps outlined in the previous section to compute the N×N covariance matrix $\Sigma$.

According to one embodiment, the optimization is formulated as a single-period problem. Those skilled in the art will recognize that another embodiment would be to formulate the problem as a multiple-period problem. The latter approach may be desirable in the case where risk and expected returns on securities are allowed to vary over time. The objective of the optimization is to determine the weight $w_i$ to be invested in each of the N positions so that the following function is minimized:

$$\min_w \frac{1}{2}\lambda w'\Sigma w - \left[\left(\frac{V-T-G}{V}\right)^{\frac{1}{H}}(1+w'r) - 1\right] \quad (37)$$

subject to $$(b-p)(D_{tax}+D_{non-tax}) \leq a'w \leq (b+p)(D_{tax}+D_{non-tax})$$
$$w'1=1$$

$$\sum_{i=1}^{N_1+N_2+N_3+N_4} w_i = \sum_{i=1}^{N_1+N_2+N_3+N_4} w_{pi}$$

and the Group 1 through Group 8 constraints identified in step 9, where $\lambda$—the risk aversion parameter—is set by the mathematical programmer. As set forth in more detail below, $\lambda$ is determined by the customer's risk level.

The term $w'\Sigma w$ in (37) represents the matrix calculations required to compute portfolio variance. When formulating the user's optimization problem, it is standard to multiply the variance term by the constant ½. This simplifies the formulas for the first and second derivatives of the objective function without having any affect on the optimal solution. If the inputs into (37) are in terms of percentages, however, this constant should be 0.005.

The term in brackets is the portfolio expected return, adjusted to account for taxes and transaction costs. The objective function is formulated to capture the idea that the user dislikes variance and likes expected return.

The first constraint is the asset allocation constraint, applied to only that portion of the portfolio that the Optimizer has the discretion to recommend trades. The second constraint makes certain that the weights sum to one. The third constraint restricts the percentage amount held in taxable accounts to its original value. This insures that the amount of money in the user's non-taxable account does not change and thereby rules out the possibility of triggering other tax ramifications. The remaining constraints are the group 1 through group 8 constraints identified in step 9. In summary, the constraints of this embodiment rule out short selling, fix the weight on those assets (such as individual stocks and assets in a 401k account) for which buys or sells are not recommended, and limits the investment in those assets not included in the Schwab determined fund universe file to no more than their original weight.

Although the risk of the user's portfolio is primarily determined by the asset allocation constraint, a value for the risk aversion parameter $\lambda$ must be specified to solve (37). The following model is used to choose $\lambda$ for each optimization run:

$$ln(\lambda) = 3.33 + 0.65 \times t_{oi} - 2.3 \times ln(\text{risk level}), \quad (38)$$

where the risk level in this embodiment varies from 1 (conservative) to 5 (aggressive). These risk levels correspond to the asset allocations depicted in FIGS. 2A through 2E, as described above. Note that equation (38) gives the natural logarithm of $\lambda$. In order to determine $\lambda$, one calculates the exponential of this value.

The model for $\lambda$ was determined by experimenting with a prototype. Specifically, for an aggressive investor with rollover cash and a 35% tax rate the value for $\lambda$ that roughly yielded a portfolio with the highest Sharpe ratio was determined. For lower levels of risk (moderately aggressive, moderate, etc.), the value for $\lambda$ that yielded an asset allocation that roughly corresponds to the asset allocation percentages for the model portfolio associated with that risk level was determined.

For each risk level, the tax rate was lowered by 10% and the value for $\lambda$ that yielded a portfolio variance similar to the portfolio variance at the corresponding risk level for the 35% tax rate was found. This process continued for successively lower tax rates. An OLS regression was fit to the resultant data yielding the results presented in (38). (The r-square value for this regression is 0.997.)

The optimization problem (37) should be solved using a non-linear optimization routine. An NLP solution technique is discussed next.

An Iterative NLP Solution

Several factors heavily influenced the design of the solution algorithm. The most important of these factors are as follows:

1. The objective function is non-linear and non-quadratic.

2. The constraint set includes inequality constraints.

3. All constraints are linear.

4. The first derivative of the objective function is discontinuous.

5. The variance-covariance matrix for the full sample is singular or near-singular (because the number of assets is near the number of observations used to estimate the input parameters and because there are redundant assets in most cases).

6. Mutual funds have minimum investment requirements.

These factors imply that the traditional quadratic programming approach to solving the portfolio optimization problem will not work. Instead, an iterative NLP solution is used in this embodiment. Since the variance-covariance matrix is nearly singular, it is often difficult to identify the maximum—or minimum—of the objective function when all assets are evaluated. The iterative solution algorithm is designed to solve these difficult cases. An iterative solution algorithm is also used to accommodate minimum investment amounts.

In this embodiment the NLP algorithm is a quasi-Newton algorithm where the first and second derivatives are approximated. A method that considers the second derivative is used because the feasible solution set may be non-convex. (A convex set is a set where a line drawn between any two points in the feasible space is contained within the set.) While evaluating the second derivative is important when the feasible solution space is non-convex, no NLP algorithm can guarantee that a global maximum/minimum has been found. This last point implies that one should be careful when communicating the optimization process to the user.

Note that traditional portfolio optimization problems that do not consider capital gains taxes or investment minimums are quadratic, implying that the feasible space is convex. This class of problems can be solved using methods that look at the first derivative only. By evaluating the second derivative, the computations necessary to find a solution are increased considerably. The matrix of second derivatives—or Hessian—has $$\frac{N(N-1)}{N}$$

distinct elements, each of which has to be approximated at each iteration of the NLP (the NLP may require as few as 10 iterations or as many as thousands of iterations to find a solution). This large increase in the amount of computations will negatively influence the speed of the routine relative to an efficiently coded routine for the simpler case.

The fact that analytical approximations to the derivatives are used means that a solution can be obtained despite the discontinuity in the first derivative. At points very near the point of discontinuity, the analytical approximation may be a poor one. An alternative embodiment is to use a non-derivative NLP algorithm (e.g., grid search) instead of a quasi-Newton algorithm. Non-derivative methods tend to be slow and it is often difficult to identify that a maximum/minimum was found. For this reason and because quasi-Newton methods are well established in the optimization literature and in practice, the preferred embodiment of the present invention uses a quasi-Newton approach. There are a variety of quasi-Newton routines that one could implement, which are well known in the art.

The iterative solution algorithm can be separated into four distinct phases. In phase 1 an attempt is made to resolve flat function problems by starting the NLP routine with different sets of initial values. The preferred embodiment uses three different sets of initial values. This can be reduced to a single set to improve run-time efficiency. If the function does not optimize with these values, in phase 2 the solution for the best case from phase 1 is used as the initial values and the optimization is rerun including only those assets with nonzero weights. Given an optimal solution from phase 1 or phase 2, in phase 3 the optimization is rerun to account for the minimum investment values. In phase 4, the solution is reported to the user.

In the flowcharts referenced in the following discussion, the following notation is used to represent solution status: STAT=1 indicates an optimal solution has been identified; STAT=2 indicates a feasible solution can not be identified; and STAT=65 indicates the attempted stepsize is less than the precision (i.e., the flatness of the function precludes a definite solution).

The first phase is illustrated on FIG. 6. Initial values (weights) are first set to zero. If STAT=1, the optimization proceeds to phase 3. If not, the initial values are set to 1. Once again, If STAT=1, the optimization proceeds to phase 3. If not, the initial values are set to 1/N. Again, If STAT=1, the optimization proceeds to phase 3. If not, the optimization proceeds to phase 2.

Phase 2 is depicted on FIG. 7. In phase 2, it is first determined whether any of the solutions from phase 1 are feasible. Then, it is determined which of the various solutions from phase 1 produces the highest value for the objective function. Then, the NLP is run on the subset of assets with nonzero weights from the best phase 1 solution. The optimization then proceeds to phase 3.

Figure 8A:
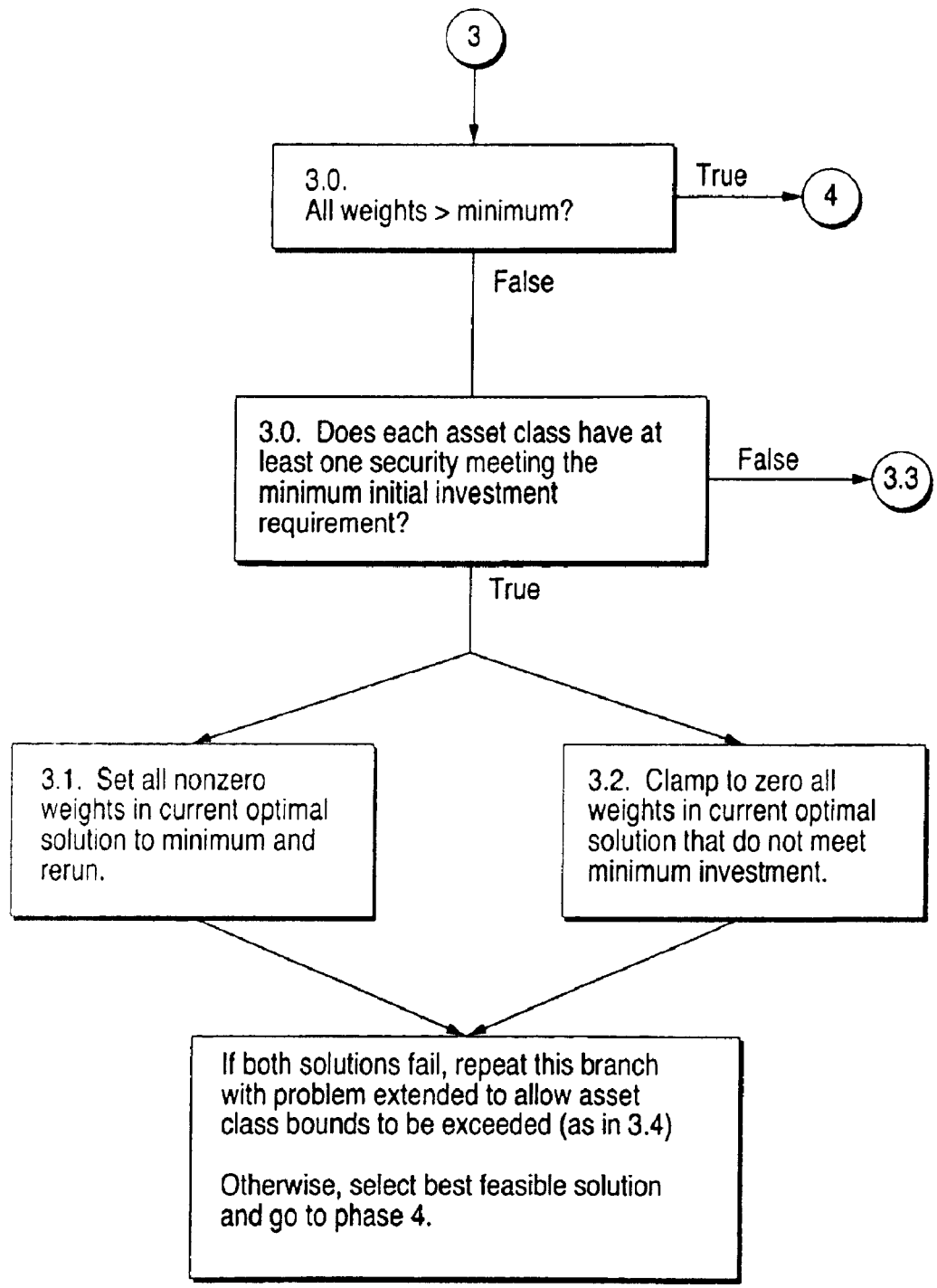
FIGS. 8A and 8B are flow charts which indicate a third phase of the optimization process according to one embodiment of the present invention.
Figure 8B:
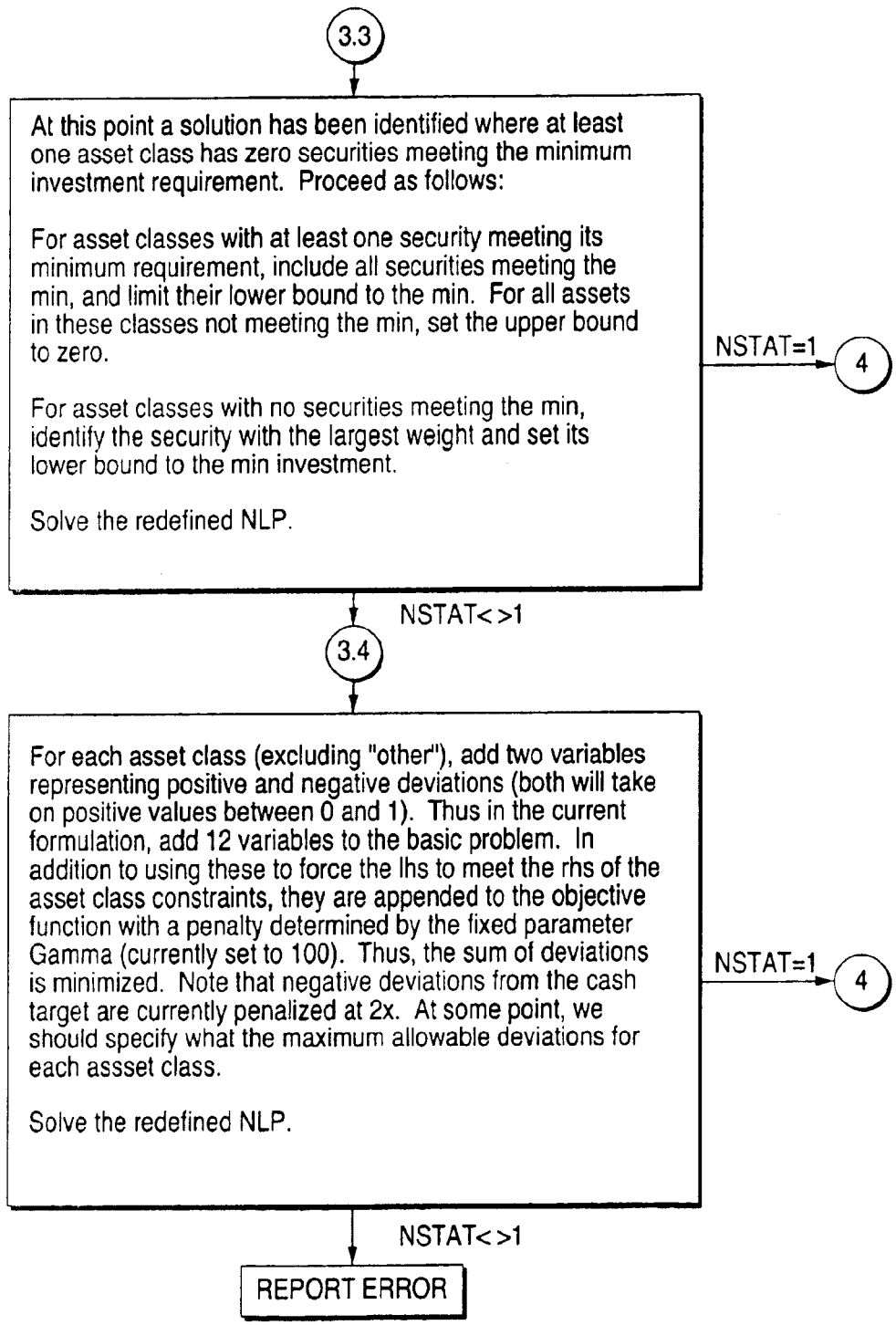

Phase 3 is depicted on FIGS. 8A and 8B. Phase 3 uses a series of branches to identify a solution that incorporates the minimum investment required for each asset (to fully account for this would require a mixed-integer NLP, which would likely require far too much computational time to solve). This phase receives as input an optimal (STAT=1) solution from phase 1 or 2. In the first case, 3.0, all weights in the optimal solution exceed the minimum so the optimization routine proceeds to phase 4 for cleanup and reporting.

If at least one weight in each asset class meets the minimum investment requirement, then the optimization proceeds to phases 3.1. and 3.2. In phase 3.1, the NLP is run on the existing solution, setting the lower bound for all nonzero weights equal to their minimum investment value. In phase 3.2, the NLP is run on the existing solution where all assets that have weights less than the minimum investment value have their upper bound clamped to zero. The solutions for phases 3.1. and 3.2. are compared and the optimal solution with the highest value for the objective function is selected. This provides the final solution for phase 4.

As noted in FIG. 8B, if at least one asset class has no weights meeting the minimum investment, the NLP is rerun in phase 3.3 as follows. For all asset classes with at least one asset meeting the minimum investment, those assets meeting the minimum requirement are included, their lower bound is set to the minimum and those securities not meeting the minimum are excluded. For asset classes with no assets meeting the minimum, the one with the highest weight is identified and its minimum value is set to the investment minimum. All other assets in this class are excluded. If the NLP solves correctly, the optimization proceeds to phase 4; otherwise, the optimization proceeds to phase 3.4.

In phase 3.4, positive and negative deviations from the asset class bounds are included in the optimization. The sum of the deviations is included as a penalty in the objective function whose impact is varied by the parameter Gamma, which is set to 100 in this embodiment. Negative deviations in the cash targets are penalized at 2× in this embodiment. Variables are initialized as in case 3.3. This method generally assures a solution when the minimum investment constraint creates problems compounded by the inability to move cash and first stage solutions from taxable to nontaxable accounts. In order to preclude "lumpy" solutions, assets with high minimum investments (above $3,000) are excluded from the recommended fund universe in this embodiment. The maximum allowable deviations from the initial targets are currently unconstrained.

Phase 4 is illustrated on FIG. 9. At this point an optimal solution has been identified from the NLP. Phase 4 is a cleanup and reporting phase which makes the transformations necessary to link the results of the optimization process with the final user interface. There are three identifiable cases to be addressed where a solution can not be reported to the user:

1) The NLP can not solve due to the lack of funds—it is possible, a priori, to determine when there is not a feasible solution due to the fund minimums and how the discretionary funds are allocated across the tax/nontax accounts. A reporting mechanism should be designed to account for this case.
2) The NLP does not indicate a solution in any phase before the minimum investment criteria are considered—given the robustness of the iterative solution method, this is not likely to occur but it cannot be ruled out. Thus, an error reporting mechanism must provide for the case where the NLP just does not work.
3) There are situations in phase 3 where it is possible for the NLP to fail. Although the flexibility of the 3.4 technique should preclude most all of these, an error is still possible. An error reporting mechanism is needed for this possibility. In these cases, however, modifying the solution approach may resolve the error.

Special Cases

As a result of the criteria used to eliminate funds from the solution set when attempting to satisfy the minimum investment constraint, it is possible to define an infeasible problem. There are two cases currently addressed:

1) If the user has initial cash in the nontaxable account and the preliminary solution has amounts invested in the fund universe that do not meet the minimum requirements, the funds in phase 3 will be clamped to zero and the cash constraint will preclude holding these funds in nontaxable cash. Thus, in this case, there is nowhere to invest the nontaxable discretionary funds. The current embodiment addresses this problem by looking at the upper bound for fund universe assets in the folded-out space. If the sum of the upper bounds is less than the proportion of discretionary nontaxable funds, the upper bound on nontaxable cash is set equal to the original proportion of cash in the nontaxable account.
2) Similarly, in both the taxable and nontaxable account, if new assets are obtained by selling all of an existing asset, then the weight of the asset sold is clamped to zero. If the recommended weights were such that they did not meet the minimum investment requirement, then phase 3 of the program, in some cases, will clamp their maximum to zero. Once again, this potentially leaves no place to invest the funds within a particular account. To solve this, the sum of the upper bounds for existing mutual funds and the funds in the Schwab determined fund universe is compared with the discretionary funds available in that account. If the sum of the upper bounds is less then the discretionary funds for the account, then the upper bound on all previously owned assets is reset to its original value (allowing funds to revert to their original position if they are insufficient to be moved to a new asset).

Implementation and User Interface

Figure 4:
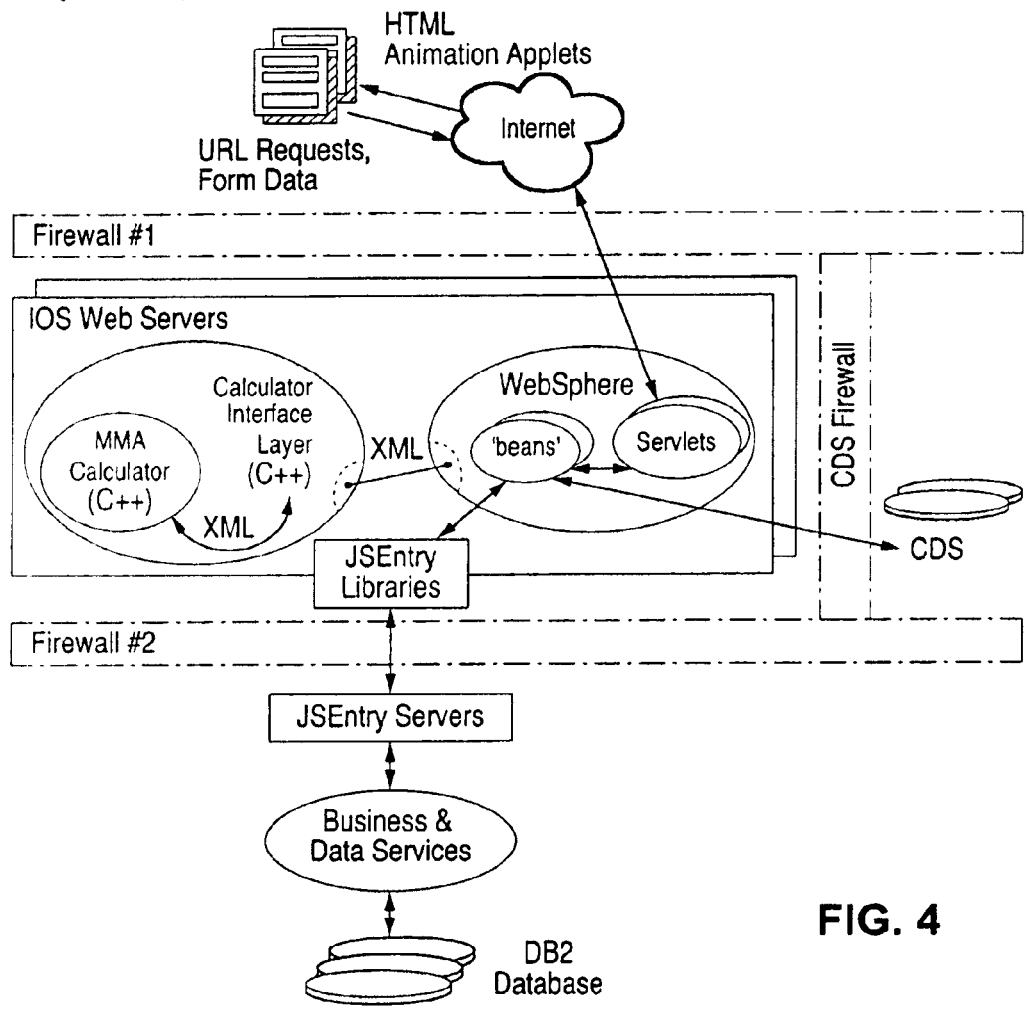
FIG. 4 indicates a high-level application environment according to one embodiment of the present invention.

The Optimizer could be implemented in a variety of ways. For example, Schwab representatives could input customer data, perform the optimization at the PC or server level, and then provide the information to the customer. Alternatively, the Optimizer and all necessary non-customer data could be provided to the customer's PC, and the customer could perform the optimization. In the preferred embodiment, the Optimizer application software resides on a server, for example an IOS Web Server as shown in FIGS. 3 and 4.

Figure 5:
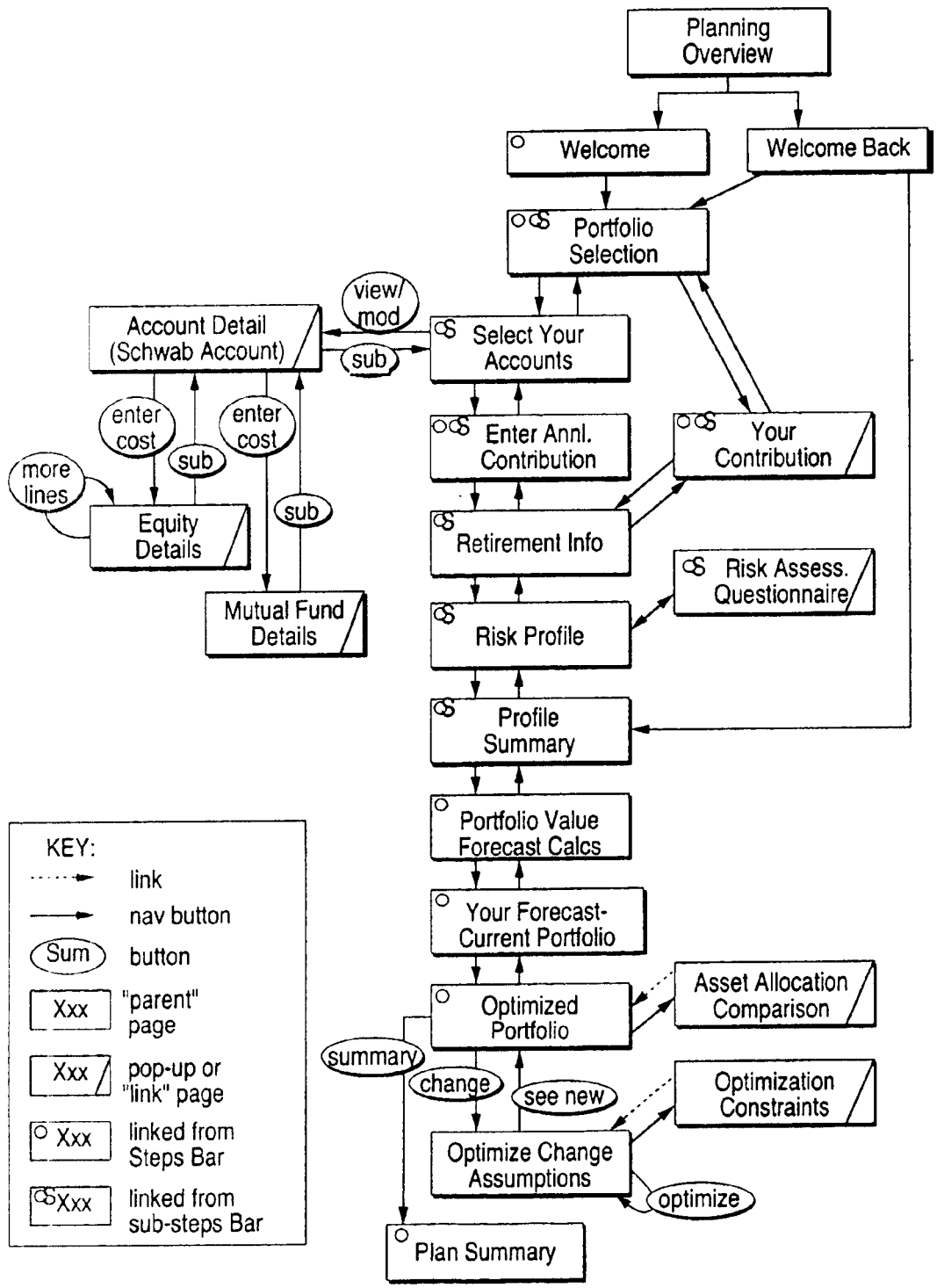
FIG. 5 is a flow chart which illustrates the method according to one embodiment of the present invention.

A representative "clickflow" diagram, indicating how a user could navigate one implementation of the Optimizer, is shown on FIG. 5. Starting from a planning overview screen, the user is welcomed. First-time users are prompted to enter portfolio information, to select accounts, to indicate an annual contribution level and retirement information and to enter risk data. The user is then guided to a profile summary screen. Users who have already entered the foregoing information would proceed directly to the profile summary screen. The user would then (optionally) proceed to one or more portfolio value forecasting screens.

The user could then choose to optimize her portfolio. The user could view asset allocation comparisons, change assumptions subject to certain constraints, and would then have the option of re-optimizing her portfolio. The user's account could be charged for using the Optimizer, either on a per-session or a per-optimization basis.

One skilled in the art will appreciate that various modifications or applied examples are conceivable which are within the scope of this invention. Accordingly, the scope of this invention is not limited to the previously-described embodiments.

We claim:

1. In a computer system a method for characterizing an investment portfolio, comprising the steps of:
    identifying a group of possible investments to be held in the investment portfolio, and wherein the group of possible investments includes a plurality of mutual funds, and one or more of the plurality of mutual finds having a corresponding investment minimum;
    inputting data for taxable investments;
    inputting data for non-taxable investments;
    inputting investor profile information;
    providing a processor programmed to perform an iterative routine that provides an optimization which utilizes the data for the taxable investments, the data for the non-taxable investments and the investor profile information and accounts for capital gains or losses on taxable investments which would be sold;
    wherein the iterative routine provides an investment recommendation which includes a recommended weighting for each investment held in the investment portfolio;
    wherein the processor is further programmed to output the investment recommendation;
    wherein the iterative routine performed by the processor includes an optimization routine, and the iterative routine includes a first step, a second step, and a third step, and the three steps are executed automatically, without any user interaction;
    wherein the first step provides for running the optimization routine using different sets of predetermined initial weights for each of the possible investments, in an attempt to identify an optimal solution which provides an optimum weight for each investment of the group of the possible investments to be held in the portfolio;

wherein when the first step does not provide an optimal solution with any of the predefined different sets of initial weights, the second step is performed, wherein the second step includes: identifying a result from the first step, which provides a weighting for each investment of the group of the possible investments, and provides that at least one of the possible investments has a weighting of zero; and using the result from the first step as a starting point and then re-running the optimization routine, using only those investments with non-zero weights from the result of the first step, to identify the optimal solution providing an optimum weight for each investment of the group of possible investments to be held in the portfolio; and wherein after the optimal solution is found using the first step or the second step, performing a third step of re-running the optimization routine to account for a minimum investment value which corresponds to a mutual fund to be held in the portfolio.

2. The method of claim 1, further including:

wherein during the first step of the iterative routine the processor is programmed to use three sets of predetermined initial weights for each of the possible investments;

wherein during the first step the optimization routine is initially run with a first set of the predetermined initial weights, and if an optimal solution is reached using the first set of predetermined weights, then the first step of the iterative routine is terminated prior to running the optimization routine with a second set of predetermined weights, and a third set of predetermined weights.

3. The method of claim 2, wherein when an optimal solution is found during the first step, the third step operates to set a lower limit for a first investment from the optimal solution at an investment minimum which corresponds to a minimum investment amount for the first investment, and then to rerun the optimization routine to provide a first solution which accounts for minimum investment amounts.

4. The method of claim 3, wherein when an optimal solution is found during the first step, the third step operates hold certain investments in the optimal solution at zero, and to rerun the optimization routine to provide a second solution which accounts for minimum investment amounts.

5. The method of claim 4, wherein the third step further includes selecting between the first solution and the second solution to provide the investment recommendation.

6. The method of claim 1 further including:

wherein the identifying a group of possible investments to be held in an investment portfolio includes excluding investments with an investment minimum amount of at least $3,000 from the group of possible investments.

* * * * *